(12) United States Patent
Triplet et al.

(10) Patent No.: US 11,048,727 B2
(45) Date of Patent: Jun. 29, 2021

(54) SYSTEMS AND METHODS FOR AUTOMATED FEATURE SELECTION AND PATTERN DISCOVERY OF MULTI-VARIATE TIME-SERIES

(71) Applicant: Ciena Corporation, Hanover, MD (US)

(72) Inventors: Thomas Triplet, Manotick (CA); David Côté, Gatineau (CA); Merlin Davies, Montreal (CA); Arslan Shahid, Ottawa (CA); Kevin Kim, Montreal (CA); Yan Liu, Montreal (CA)

(73) Assignee: Ciena Corporation, Hanover, MD (US)

( * ) Notice: Subject to any disclaimer, the term of this patent is extended or adjusted under 35 U.S.C. 154(b) by 402 days.

(21) Appl. No.: 16/126,295

(22) Filed: Sep. 10, 2018

(65) Prior Publication Data
US 2020/0082013 A1 Mar. 12, 2020

(51) Int. Cl.
*G06F 16/28* (2019.01)
*G06N 5/02* (2006.01)
*G06N 20/00* (2019.01)

(52) U.S. Cl.
CPC .......... *G06F 16/285* (2019.01); *G06N 5/022* (2013.01); *G06N 20/00* (2019.01)

(58) Field of Classification Search
CPC ...... G06F 16/285; G06N 20/00; G06N 5/022; G06K 9/6228; G06K 9/6219; G06K 9/00496
USPC .......................................................... 706/46
See application file for complete search history.

(56) References Cited

U.S. PATENT DOCUMENTS

| | | | |
|---|---|---|---|
| 2013/0318011 A1* | 11/2013 | Jones | G05B 23/02 706/12 |
| 2016/0330083 A1 | 11/2016 | Djukic et al. | |
| 2017/0086208 A1 | 3/2017 | Côté et al. | |
| 2017/0097980 A1* | 4/2017 | Ishii | G06F 16/285 |
| 2017/0284896 A1* | 10/2017 | Harpale | G01M 15/14 |

(Continued)

OTHER PUBLICATIONS

Salvador et al., FastDTW: Toward Accurate Dynamic Time Warping in Linear Time and Space, 2004, pp. 1-11.

(Continued)

*Primary Examiner* — Jonathan Han
(74) *Attorney, Agent, or Firm* — Clements Bernard Walker; Lawrence A. Baratta, Jr.; Christopher L. Bernard

(57) ABSTRACT

Systems and methods of automated feature selection and pattern discovery of multi-variate time-series include obtaining a multi-variate times-series from a network; pre-processing the multi-variate times-series to account for sampling intervals and missing data in the multi-variate times-series; determining a distance matrix for the multi-variate times-series which estimates correlation among features in the multi-variate times-series; performing clustering on the distance matrix; reducing dimensionality of the multi-variate times-series based on the clustering to provide a lower-dimensionality time-series; and providing the lower-dimensionality time-series to one or more applications configured to analyze the multi-variate times-series from the network, wherein the lower-dimensionality time-series provides similar information as the multi-variate time-series with fewer dimensions thereby improving computational complexity of the one or more applications.

20 Claims, 23 Drawing Sheets

(56) References Cited

U.S. PATENT DOCUMENTS

2018/0260560 A1* 9/2018 Gross ................ G06F 11/3055
2019/0019350 A1* 1/2019 Harish ................ G01C 21/362

OTHER PUBLICATIONS

Al-Neama et al., Accelerated Guide Trees Construction for Multiple Sequence Alignment, ISSN 2320-5407 International Journal of Advanced Research (2014), vol. 2, Issue 4, pp. 14-22.

He et al., MR-DBSCAN: a scalable MapReduce-based DBSCAN algorithm for heavily skewed data, Front. Comput. Sci., 2014, 8(1): pp. 83-99, DOI 10.1007/s11704-013-3158-3.

Revesz et al., Classification integration and reclassification using constraint databases, Artificial Intelligence in Medicine 49 (2010) pp. 79-91.

Ester et al., A Density-Based Algorithm for Discovering Clusters in Large Spatial Databases with Noise, KDD-96 Proceedings. Copyright © 1996, AAAI, pp. 226-231.

\* cited by examiner

Algorithm 1: Parallel Neighbor-Joining Algorithm

Input:
    The number of time series $N$;
    The distance matrix $dm$;

Output:
    The updated distance matrix $dm$;

1: Broadcast $dm$
2: for $h = 1$ to $N - 2$ do do
3:    Compute $R_i$ in parrel.
    The cells of the distance matrix are grouped by their row index $i$ and summed using the reduceByKey tranformation. A collectAsMap tranformation is applied to $R_i$ at the beginning of the next stage in order to obtain a map variable with the row $i$ as key and the sum of the row as values;
4:    Broadcast $R_i$;
5:    for all $i$, $j$ do
6:      Compute $Q_h$ using broadcasted $R_i$ in parallel using Spark's map transformation. Equation (1) is applied to all cells of the distance matrix $dm$;
7:    end for
8:    Search the minimum $Q_h$ to get neighbors $i$ and $j$. The Spark filter transformation is applied to obtain the minumum $Q_h$;
9:    Node $i$ and $j$ are joined as a new Node $U_h$;
10:   Compute updated distance $D_{u_h k}$ according to Equation (2);
11:   Compute branch lengths $L_{iU_h}$ and $L_{jU_h}$ according to Equation (3);
12:   Delete node $i$ and $j$, and add $U_h$ to current node lists;
13:   Update the distance matrix $dm$;
14: end for
15: Join the last two nodes
16: return $dm$

*FIG. 12*

Algorithm 2: FastDTW

Input: Time series $X_i, X_j, (i \neq j)$ and *radius* - distance to search outside of the projected warp path of the previous resolution when refining the warp path

Output: $dtwCoefficient$ between warp path of $X_i$ and $X_j$

1: minTSsize = radius +2
2: if ($|X_i| \leq$ minTSsize OR $|X_j| \leq$ minTSsize) then
3:     //For small input time series, run traditional DTW
4:     RETURN DTW($X_i, X_j$)
5: else
6:     $X_i' = X_i$.reduceByHalf()
7:     $X_j' = X_j$.reduceByHalf()
8:     lowResPath = FastDTW($X_i', X_j'$, radius)
9:     searchWindow = ExpandedResWindow(lowResPath, $X_i$, $X_j$, radius)
10:     RETURN DTW($X_i, X_j$, searchWindow)
11: end if

FIG. 17

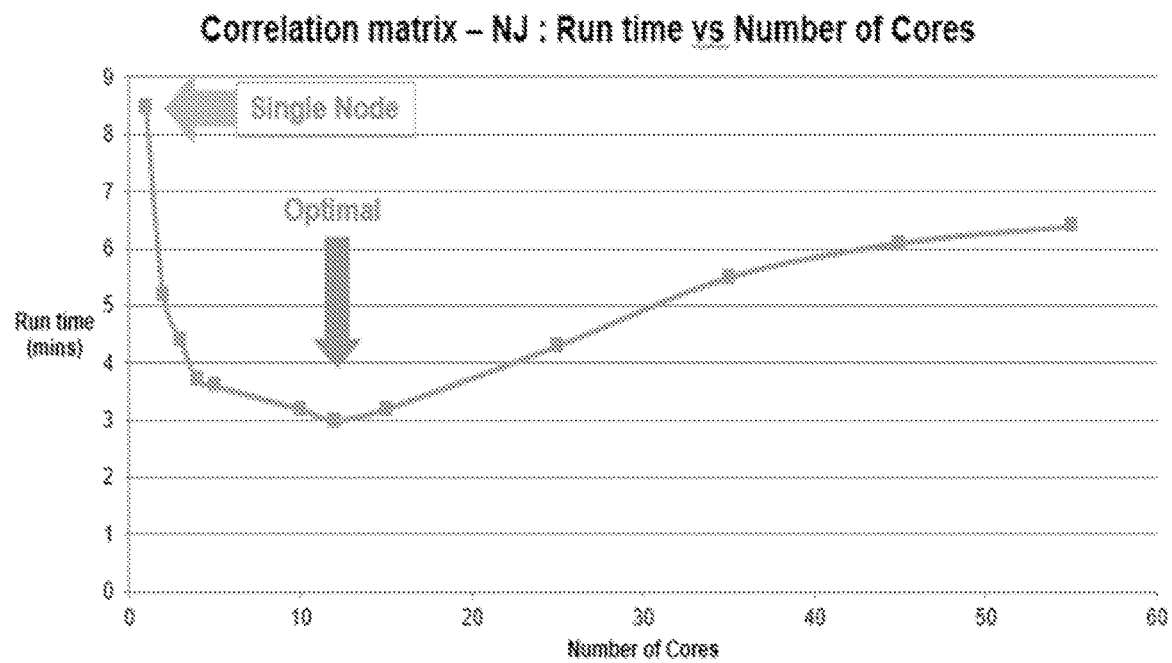
FIG. 21
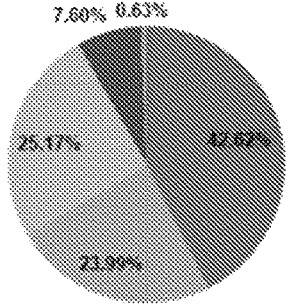 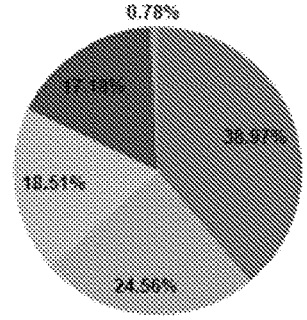
FIG. 22

SYSTEMS AND METHODS FOR AUTOMATED FEATURE SELECTION AND PATTERN DISCOVERY OF MULTI-VARIATE TIME-SERIES

FIELD OF THE DISCLOSURE

The present disclosure generally relates to data analytics. More particularly, the present disclosure relates to systems and methods for automated feature selection and pattern discovery of multi-variate time-series which converts the multi-variate time-series into a lower-dimensionality time-series without information loss.

BACKGROUND OF THE DISCLOSURE

The ability of Artificial Intelligence (AI) systems to acquire their own knowledge by extracting patterns from raw data is known as Machine Learning (ML). Rooted in classical linear algebra and probability theory, this technology has been proven to work for a growing number of tasks, ranging from image recognition to natural language processing and others. ML is particularly powerful in the presence of massive amounts of data (a.k.a. "Big Data"). Increasingly large datasets enable increasingly accurate learning during the training of ML. At the same time, increasingly large datasets can no longer be grasped by eye, by humans, but can be scanned by computers running ML-driven algorithms. It would be advantageous to apply ML techniques to networks. Networks can contain hundreds or even thousands of network elements (NEs). This number gets much larger for packet, Internet Protocol (IP), mobile, or "Internet of Things" (IoT) networks. All these network elements/devices produce large amounts of data that could be consumed by ML including sensor data, Performance Monitoring (PM) data, etc.

In machine learning and statistics, feature selection, also known as variable selection, attribute selection or variable subset selection, is the process of selecting a subset of relevant features (variables, predictors) for use in model construction. Also, dimensionality reduction is the process of reducing the number of random variables under consideration by obtaining a set of principal variables. The central premise for feature selection and dimensionality reduction is that the data contains some features that are either redundant or irrelevant and can thus be removed without incurring much loss of information. Redundant and irrelevant are two distinct notions, since one relevant feature may be redundant in the presence of another relevant feature with which it is strongly correlated.

While feature selection and dimensionality reduction have been extensively studied in machine learning scenarios where the computational complexity increases exponentially with the number of dimensions of the feature space, satisfying solutions for reducing the dimensionality of multivariate time-series (such as sensor data, PMs, etc.) are still lacking. Conventional approaches focus on static datasets rather than multi-variate time-series.

A first approach includes evaluating the worth of individual features by measuring the information gain with respect to the class to predict, that is, by computing the expected reduction in entropy caused by partitioning the examples according to the given feature. There are several algorithms to compute this expected entropy reduction. The features are then sorted by their expected information gain. The reduced feature set is obtained by selecting the top n features, or by thresholding the information gain value.

Another approach referred to as Principal Component Analysis (PCA) converts a set of observations of possibly correlated variables into a set of values of linearly uncorrelated variables called principal components. The resulting principal components are sorted by decreasing variance. Dimensionality reduction is accomplished by choosing enough components to account for some percentage of the variance in the original data, typically 95%. Numerous variants of this approach have been proposed to improve the original algorithm.

Both the information gain and PCA approaches are not suited to select features of multi-variate time-series. In particular, they will fail to analyze time-series properly. Approaches that rely on information gain maximization to reduce dimensionality cannot combine two or more features into a single feature, i.e., the selected features are only a subset of the original set of features. While mathematically sound, the computational complexity of the PCA analysis is $O(d^3+nd^2)$, where d is the number of dimensions and n is the size of the dataset, making it computationally prohibitive when the number of dimensions is very high, i.e., when dimensionality reduction is most useful. Non-linear variants of PCA have even higher computational complexity. In addition, the PCA approach relies on eigenvalue decomposition, which is inherently difficult to distribute in a computing cluster. Also, features computed by PCA analysis are mapped into a new feature space, making their interpretation and validation by a human expert difficult.

BRIEF SUMMARY OF THE DISCLOSURE

In an embodiment, a method of automated feature selection and pattern discovery of multi-variate time-series includes obtaining a multi-variate times-series from a network; preprocessing the multi-variate times-series to account for sampling intervals and missing data in the multi-variate times-series; determining a distance matrix for the multi-variate times-series which estimates correlation among features in the multi-variate times-series; performing clustering on the distance matrix; reducing dimensionality of the multi-variate times-series based on the clustering to provide a lower-dimensionality time-series; and providing the lower-dimensionality time-series to one or more applications configured to analyze the multi-variate times-series from the network, wherein the lower-dimensionality time-series provides similar information as the multi-variate time-series with fewer dimensions thereby improving computational complexity of the one or more applications.

The distance matrix can be a first distance matrix, and the method can further include determining a second distance matrix for the multi-variate times-series with a different technique than the first distance matrix; performing clustering on the second distance matrix; and utilizing the clustered second distance matrix to validate results for the lower-dimensionality time-series from the first distance matrix. The second distance matrix can be generated using correlation and the clustering on the second distance matrix is performed utilizing neighbor-joining, wherein the first distance matrix is generated using Dynamic Time Warping, the dimensionality is reduced utilizing Principal Component Analysis, and the clustering on the first distance matrix is performed using DBSCAN. The distance matrix can be determined through a sequence alignment algorithm. The clustering can utilize neighbor-joining where features with a smallest distance are cluster first. The multi-variate times-series can include Performance Monitoring (PM) data from a telecommunications network or data from Internet of Things (IoT) devices.

In another embodiment, a computing system includes one or more processors; and memory storing instructions that, when executed, cause the one or more processors to obtain a multi-variate times-series from a network, preprocess the multi-variate times-series to account for sampling intervals and missing data in the multi-variate times-series, determine a distance matrix for the multi-variate times-series which estimates correlation among features in the multi-variate times-series, perform clustering on the distance matrix, reduce dimensionality of the multi-variate times-series based on the clustering to provide a lower-dimensionality time-series, and provide the lower-dimensionality time-series to one or more applications configured to analyze the multi-variate times-series from the network, wherein the lower-dimensionality time-series provides similar information as the multi-variate time-series with fewer dimensions thereby improving computational complexity of the one or more applications.

The distance matrix can be a first distance matrix, and the memory storing instructions that, when executed, can further cause the one or more processors to determine a second distance matrix for the multi-variate times-series with a different technique than the first distance matrix, perform clustering on the second distance matrix, and utilize the clustered second distance matrix to validate results for the lower-dimensionality time-series from the first distance matrix. The second distance matrix can be generated using correlation and the clustering on the second distance matrix can be performed utilizing neighbor-joining, wherein the first distance matrix is generated using Dynamic Time Warping, the dimensionality is reduced utilizing Principal Component Analysis, and the clustering on the first distance matrix is performed using DBSCAN. The distance matrix can be determined through a sequence alignment algorithm. The cluster can utilize neighbor-joining where features with a smallest distance are cluster first. The multi-variate times-series can include Performance Monitoring (PM) data from a telecommunications network or data from Internet of Things (IoT) devices.

In a further embodiment, a non-transitory computer-readable medium including instructions that, when executed, cause one or more processors to perform the steps of obtaining a multi-variate times-series from a network; preprocessing the multi-variate times-series to account for sampling intervals and missing data in the multi-variate times-series; determining a distance matrix for the multi-variate times-series which estimates correlation among features in the multi-variate times-series; performing clustering on the distance matrix; reducing dimensionality of the multi-variate times-series based on the clustering to provide a lower-dimensionality time-series; and providing the lower-dimensionality time-series to one or more applications configured to analyze the multi-variate times-series from the network, wherein the lower-dimensionality time-series provides similar information as the multi-variate time-series with fewer dimensions thereby improving computational complexity of the one or more applications.

The distance matrix can be a first distance matrix, and wherein the instructions that, when executed, can further cause one or more processors to perform the steps of determining a second distance matrix for the multi-variate times-series with a different technique than the first distance matrix; performing clustering on the second distance matrix; and utilizing the clustered second distance matrix to validate results for the lower-dimensionality time-series from the first distance matrix. The second distance matrix can be generated using correlation and the clustering on the second distance matrix can be performed utilizing neighbor-joining, wherein the first distance matrix can be generated using Dynamic Time Warping, the dimensionality is reduced utilizing Principal Component Analysis, and the clustering on the first distance matrix can be performed using DBSCAN. The multi-variate times-series can include one of Performance Monitoring (PM) data from a telecommunications network and data from Internet of Things (IoT) devices. The distance matrix can be determined through a sequence alignment algorithm. The cluster can utilize neighbor-joining where features with a smallest distance are cluster first.

BRIEF DESCRIPTION OF THE DRAWINGS

The present disclosure is illustrated and described herein with reference to the various drawings, in which like reference numbers are used to denote like system components/method steps, as appropriate, and in which:

FIG. 12 is a listing of parallelization of the neighbor-joining algorithm;

FIG. 17 is a listing of a FastDTW algorithm;

FIG. 21 is a graph of the processing time of the neighbor-joining workflow as the number of cores scales from 1 to 55;

FIG. 22 is a graph of processing time decomposition of neighbor-joining tasks by varying the number of cores;

DETAILED DESCRIPTION OF THE DISCLOSURE

Figure 1:
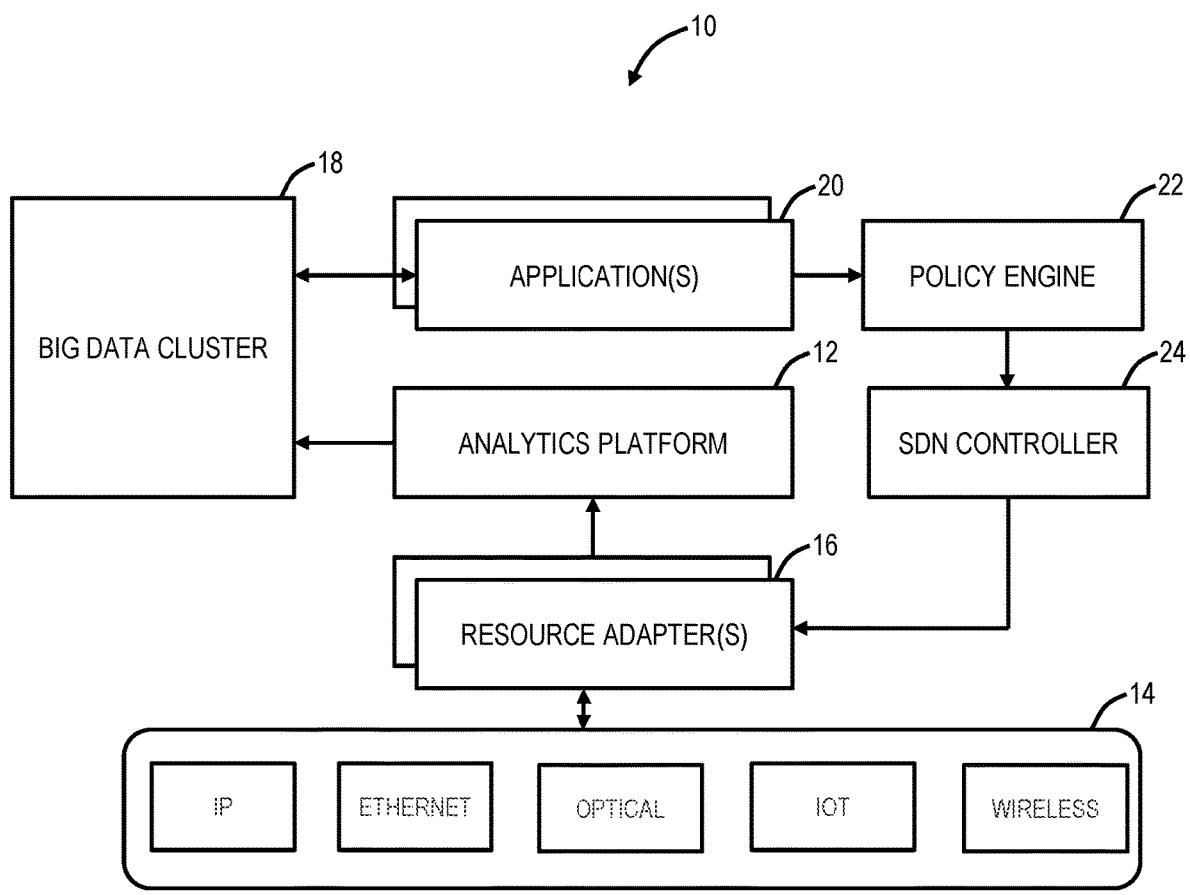
FIG. 1 is a block diagram of a data analysis system which can implement the systems and methods for automated feature selection and pattern discovery of multi-variate time-series.

In various embodiments, the present disclosure relates to systems and methods for automated feature selection and pattern discovery of multi-variate time-series. The systems and methods provide a feature-selection engine which can be used in network analytic applications. This engine is based on techniques that are horizontally scalable, making them suitable to analyze time-series/PMs from arbitrary large networks. The same clustering techniques can also be used to feed semi-supervised learning algorithms that are expected to improve the performance of Machine Learning (ML) applications in the presence of sparse (low statistics) amount of labeled data for the ML training and testing.

ML can be leveraged for analyzing incoming PM data from networks to derive valuable insights. The systems and methods address how to choose a particular set of PMs. Without the systems and methods, expert knowledge is required about the behavior of the equipment being monitored to hand pick the specific PMs to monitor. Otherwise, this knowledge is unavailable, as is the case, for example, with a multi-vendor use case, an Internet of Things (IoT) use case, etc., then choosing the most relevant PMs is a problem. To that end, the systems and methods solve this problem while avoiding the so-called curse of dimensionality by introducing an automatic feature-selection engine. Furthermore, the automatic feature-selection engine can include distributed clustering techniques that can also be used for semi-supervised ML. In this case, the objective is to identify clusters of events that belong to the same category. If a few events in the clusters have the same label and the others are unlabeled, it can be assumed that all events from the cluster actually have the same label for the sake of ML training and testing.

Thus, the systems and methods provide a feature-selection engine that enables automatic determination of most relevant input PM data, prior to feeding a data-driven software application. That is, the systems and methods input a multivariate time-series and output a lower-dimensionality time-series for the data-driven software application. The systems and methods are scalable and enable hierarchical feature selection and density-based unsupervised pattern detection in multivariate time-series, without prior knowledge about the data, making the approach suitable in an IoT or multi-vendor context, for a networking application. The systems and methods can analyze arbitrarily large datasets. As a result, unlike previous work, the systems and methods can be used in practice to analyze very large amounts of data from real-world networks.

IoT

IoT relates to the interconnection of home, mobile, and embedded applications to the Internet to provide additional functionality. Millions of devices are already connected to the Internet. These intelligent IoT devices and groups of IoT devices can act as a system to share data over the cloud. The data generated from these IoT devices have been analyzed to transform the operations of many industrial domains. Data gathered directly from these IoT devices usually is unformatted and has thousands of features (a particular time-series in the multivariate time-series is a "feature"). Such raw data needs to go through a transformation, pre-processing, and intensive analysis in order to understand the underlying insights of data. A common type of data generated is time-series, which is defined as data that is acquired at a fixed interval over a period of time. Examples are datasets of the home temperature of a smart thermostat over the course of many days; the heart rate gathered by a smart wristband over a run; the Global Positioning Satellite (GPS) location of a runner over the span of the run, and networking infrastructure metrics from a telecommunication service provider reflecting the demand incurred by the end-users. On their own, they are processed by any traditional analytical tools, however on a large scale with millions of devices each producing a sequence of time-series data, more scalable analysis is essential for applications relying on timely and accurate analysis. An illustrating case of the above challenges is observed from data sets collected by a telecommunication service company where datasets on networking devices have been collected to measure the key performance indicators of the operational networks. A record of each feature of the device is producing a reading at each time stamp.

The systems and methods are described herein with respect to IoT as an example use case. Those of ordinary skill in the art will recognize the systems and methods can be used in any networking system as well in other types of systems generating large-scale time-series data.

In an example, an IoT device can have 350 or more different features providing time-series data. The objective and motivation of the systems and methods are to identify patterns within the data to find a correlation between different features, to enable dimensionality reduction.

Data Analysis System

The research questions of scalable analysis raise from three aspects upon distributed and parallel development, including 1) Unknown data correlation—What are the metrics to measure the correlation? 2) High dimensionality—How to process multiple features in parallel so that operations on features such as join or group are executed on partitioned datasets? and 3) Algorithm diversity—How does an algorithm affect parallelism, potentially causing data skew and eventually degrade scalability?

The systems and methods provide parallel clustering techniques for identifying a correlation pattern. The techniques realize clustering using different types of algorithms. For example, two parallel workflows can each include clustering algorithms and their corresponding distance metrics adapted for the distributed parallel computing framework. To horizontally scale the system, techniques address data partitioning, load-balancing, and data shuffling. The scalability of these algorithms running in parallel is also compared to the data size and the number of distributed worker nodes grow.

FIG. 1 is a block diagram of a data analysis system 10 which can implement the systems and methods for automated feature selection and pattern discovery of multi-variate time-series. The data analysis system 10 includes an analytics platform 12 which can collect data from network devices 14, such as via Resource Adapters (RA) 16. The data can include PM data, sensor data, telemetry data, etc. and it can be stored in a big data cluster 18. Data-driven applications 18 can analyze the data in the big data cluster 18, determine insights, and report the insights to end-users and/or a policy engine 22. The policy engine 22 can trigger actions, such as via a Software Defined Networking (SDN) controller 24, for automatic implementation in the associated network devices 14.

The network devices 14 can be any time of network device/element including IP, Ethernet, optical, IoT, wireless, etc. The RA 16 can provide an intermediary function between the analytics platform 12 and different types/vendors/etc. of the network devices 14. The applications 18 can be any consumer of the network data collected and stored in the big data cluster 18. For example, the applications 18 can include a Network Health Predictor (NHP), a Service Health Predictor (SHP), Application Health Predictor (AHP) or others which read back this data, analyze it and report insights to end-users or the policy engine 22, the SDN controller 24, etc. Most notably, these applications 20 can make use of a machine learning engine. The policy engine 22 can abstract the insights reported by the applications 20 for resulting actions on the network.

Those skilled in the art recognize various problems can occur in a telecommunications network. At the optical layer, fibers can be moved, pinched or partially disconnected, light can be attenuated, device performance can decrease from aging, drift, etc. At the packet layer, Code Violations can be introduced, Frame Check Sequence (FCS) can burst, Ethernet Frames can be corrupted or dropped, etc. At the service layer, there can be un-availability, low throughput, high latency, high jitter, etc. At the application layer, there can be poor audio/video quality, slow response time, and so on. Each of these problems has a root cause and can have an impact on other elements of the network, which can all be characterized by a variety of PM data.

In an embodiment, the ML applications can be hosted on a single computer with regular data storage and CPU. Providing there is software able to collect raw data and transform it into a consumable format by ML algorithms. This basic setup is sufficient to process small data sets in non-production environments. To use deep learning algorithms, it is generally required to accelerate computations with specialized hardware such as Graphics Processing Units (GPU's) or Tensor Processing Units (TPU's). To exploit synergies of ML with Big Data, more infrastructure is required to handle the large Variety, Volume and/or Velocity of the "Big" data. Wide variety requires an abstraction layer between the raw inputs from many sources and the ML algorithms. This abstraction layer can include resource adapters. Large volume requires distributed storage and parallel computing on a computer cluster. This is referred to as the "data lake" or a "cloud." Furthermore, it employs a mechanism to read back and process batches of data. This is commonly achieved with software tools such as Apache Hadoop and Apache Spark. Finally, fast velocity requires data-streaming capabilities. This can be achieved by employing tools like Apache Kafka to the Hadoop/Spark cluster.

Data

A variety of data sources can be exploited to get information about every component of the network, from the physical (or virtual) devices to the communication channels, the usage patterns, the environment, and the business context. Network devices (e.g., network elements) generate PM, alarms, and/or logging data. These include things like power levels, error counters, received, transmitted or dropped packets, Central Processing Unit (CPU) utilization, geo-coordinates, threshold cross, etc. Communication channels (or "services") also generate PM data, for all layers of the Open Systems Interconnection (OSI) model (ISO/IEC standard 7498-1, 1994). For instance, Layer 3 network performance is characterized by bandwidth, throughput, latency, jitter and error rate. End-users', environmental, or business data typically come from third-party databases. IoT related data can include sensor readings, geo-location, etc.

Each time any of the above data is collected, it is useful to record a timestamp associated with it. Time is especially important because it can be used to correlate independent data sources. For instance, data from different sources can be associated if they were all taken during the same time interval, to define a "snapshot." Furthermore, sorting data in chronological order is frequently used to measure time-series trends to anticipate future events.

Most networks connect to a plurality of device types. And different types of devices from different equipment vendors tend to produce different data in different formats. Hence, communication networks are said to generate a wide variety of data. In addition, the frequency at which the above data is collected (a.k.a. velocity) can vary for each source. Likewise, the amount of time during which the data is kept in storage can also vary. When networks contain a large number of devices and services, with high-frequency data-collection and/or long storage periods, the result is large data volumes. The combined Variety, Velocity and Volume is often referred to as "Big Data."

Equipped with sufficient infrastructure, a common approach is to collect and store all available data, and enable ad-hoc analysis after the fact (i.e., in a reactive manner). When this is not possible, tradeoffs have to be made to only pick the most valuable data for the targeted application(s). For example, an optical networking effect was explained more accurately when using additional inputs such as weather data (D. Charlton et al., "Field measurements of SOP transients in OPGW, with time and location correlation to lightning strikes," Optics Express, Vol. 25, No. 9, May 2017). With the systems and methods described herein, wider variety, larger velocity and larger volumes of data will broaden the coverage and increase the accuracy of ML-driven applications.

The software application 20 of the systems and methods can use relevant PM data along with other data to describe the behavior of a telecommunications network. The network can include an optical layer (e.g., Dense Wavelength Division Multiplexing (DWDM), etc.), a Time Division Multiplexing (TDM) layer (e.g., Optical Transport Network (OTN), Synchronous Optical Network (SONET), Flexible Ethernet (FlexE), etc.), a packet layer (e.g., Ethernet, Multiprotocol Label Switching (MPLS), Internet Protocol (IP), etc.), and the like. Those skilled in the art will recognize actual network implementations can span multiple layers. The software application 20 can operate at a single layer or concurrently at multiple layers. Each of these layers can include associated PM data which describes the operational status over time at the layer.

Examples of PM data include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/service. The alarm data can be various types of alarms supported by a network device 14. The hardware operating metrics can include temperature, memory usage, in-service time, etc.

Throughout, the term network elements (NE) can interchangeably refer to a variety of network devices, such as nodes, shelves, cards, ports, or even groups of such NEs. No matter the identity of the elements, however, the technique described herein for determining the normalcy of their behavior remains similar and remains valid as long as the relevant data for each element are accessible to the anomaly detection software application.

The systems and methods include building a single trend from multiple PM data time-series and using the single trend to predict network anomalies for proactive actions. Both these techniques can be implemented in a machine learning engine that can use arbitrary PM data from any device type, any vendor, etc.

For example, in an IoT scenario, a dataset under study includes 358 columns and 305078 rows with empty cells making up approximately 350 MB. Each row represents a set of concurrent alarm-like features, and each column represents a specific type of descriptive features related to the status of a device and presumably the network it is connected to. A large number of empty cells presume no occurrence of a value. The initial assessment of the dataset with limited business knowledge reveal that data come from multiple devices; all timestamp readings have the set of 350 features; data is highly sparse, and over 40% timestamps are empty, and time intervals where the data is sampled are disparate across all devices without a uniform sampling interval.

Figure 2:
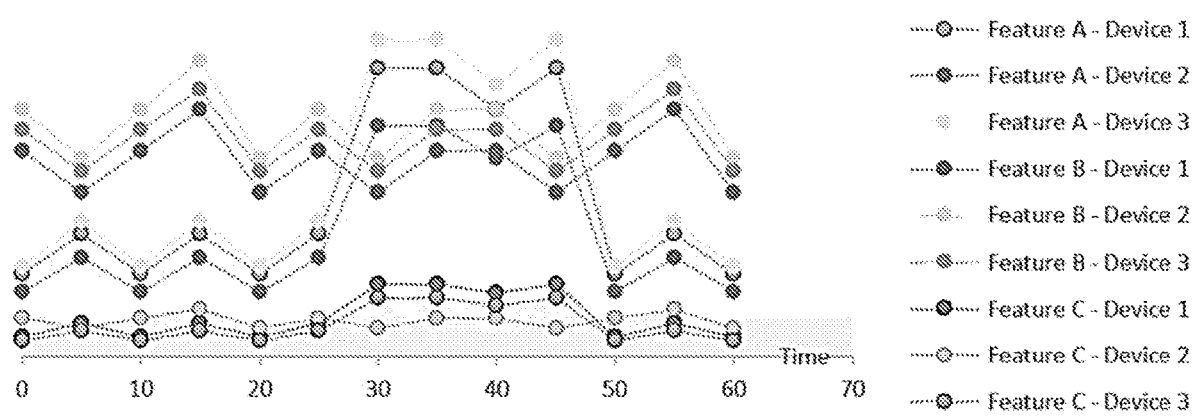
FIG. 2 is a graph of a 9 time-series of three sample features on three devices.

A sample plotting of the data set is depicted in FIG. 2. The plot shows an example of three features A, B, C from three devices that are totally 9 time-series. The sampling interval is at every 5 seconds and is observed from 0 to 60 seconds. Data coming from the same feature have a similar curve irrespective of the device they are from. Different features also show different behaviors. The three bottom time-series show constant low values with little fluctuation. The middle three series have a spike starting at the 25 second that lasts until the 45 second before they set back to normal. The upper three time-series are of higher values with constant fluctuation.

Parallel and Distribution

Mining patterns on this dataset can involve pairwise operations of all the data records. The volume of the dataset described herein as an example is only a small portion of the production environment data. The preprocessing operations as Extract-Transform-Load (ETL) and the machine learning algorithms becomes data and computing intensive. Parallelism and distribution are both computing paradigms that benefit our data volume. Parallelism is the process of launching multiple computing instances of subsets of a same task in parallel. Distributed computing stems from the need to leverage a networked cluster of processing nodes in order to achieve a common computing goal. Parallelism can be achieved on both a single multi-core node or on a cluster of commodity nodes. By leveraging the elasticity of cloud computing that computing nodes are added and removed on demands, it is obvious that combining both computing is more scalable than single node parallelism. Under this paradigm, the dataset as the input is partitioned over a number of working nodes, and all the working nodes are executing operations in parallel.

Frameworks such as Apache Hadoop, Apache Spark, and Apache Storm provide various types of distributed parallel runtimes that allow the programming of data processing and analysis operations. For example, Apache Spark can be used for building the distributed and parallel data operations that involve functions for ETL and machine learning algorithms.

Data Partition and Locality

The high dimensionality and the big size of the dataset impose the technical challenges on exploring the answers to questions such as Are different time-series datasets correlated to each other? The answer helps one to understand if connected devices have correlations with each other.

Which datasets to discard to help to reduce the computational burden while preserving the analysis accuracy desired?

Are there recurrent patterns in the dataset that can be discovered by different kinds of clustering approaches?

The answers to each question above involve pairwise analysis of features. Suppose there are n number of features and the sample size is m, the computation size of the dataset can be estimated at the level of $n^2 \times m$. When the computation of analysis exceeds the capacity of a single computing node, it is essential to scale out the analysis to a distributed cluster.

With the paradigm of distributed computing, the dataset is partitioned at two levels. At the first level, dataset partitions m samples top partitions. Thus each node has mlp time-series. At this level, the partition is evenly distributed in terms of the data size.

At the second level, operations on pair wised features such as merging or joining further produce new sets of intermediate data. The new dataset is further aggregated by keys and shuffled across the partitions. When the partitions are distributed on separate nodes, the shuffling cause network traffic.

From the above analysis, the problem can be scoped to two issues:

Data locality. According to an algorithm, the data with correlations are ensured to locate in the same partition or with close partitions. Hence, the analysis tasks at runtime are moved to the location where necessary data locate to complete the computation.

Data Repartition. At the intermediate stage of the analysis, newly produced data may cause an imbalance of data partitions and thus leads to data skew. Hence repartition at runtime is performed. In addition, the repartition needs to be tuned to have optimal system performance, such as tuning the frequencies of repartition.

Computational Complexity

The computational complexity of many algorithms to analyze data increases exponentially with the number of dimensions of the input dataset. This problem, known as a combinatorial explosion, impacts a wide variety of analytics algorithms, ranging from simple nearest neighbor search to more complex optimization or machine learning algorithms. This computational complexity makes those algorithms impractical for many applications and greatly limits their applicability in particular in the Internet-of-Things (IoT) and telecom spaces where hundreds of sensor data or performance metrics (PM) may be collected by millions of network elements, each PM corresponding to one dimension. For instance, a typical instance of a Network Management System (NMS) references 800+performance metrics, corresponding to as many dimensions.

In addition to the increased computational complexity, a very large number of dimensions are likely to be irrelevant, which tends to increase the noise and reduces the accuracy of the algorithms. In some cases, dimensionality reduction can also guard against overfitting. Hence, even if an exhaustive search of a higher dimensional feature was computationally doable, this is not desirable for most practical telecom analytics applications.

For this reason, feature selection and dimensionality reduction are critical pre-processing components of most applications where PMs are being analyzed. This is, in particular, the case for a network analytic system, which can include several hard-coded, manually selected PMs from among the 800+ available ones. This manual selection is time-consuming, non-optimal and cannot adapt dynamically based on actual data, and yet is critical to ensure the accuracy of the algorithms and machine-learning models (e.g., the Likelihood) in network health applications, where the input PMs must be uncorrelated if the resulting combined p-values are to be viewed as true probabilities. The problem is exacerbated in the case of applications in a multi-vendor environment where we have no expertise about the input PMs. Using the systems and methods described herein, the relevant PMs could be selected automatically.

Figure 3:
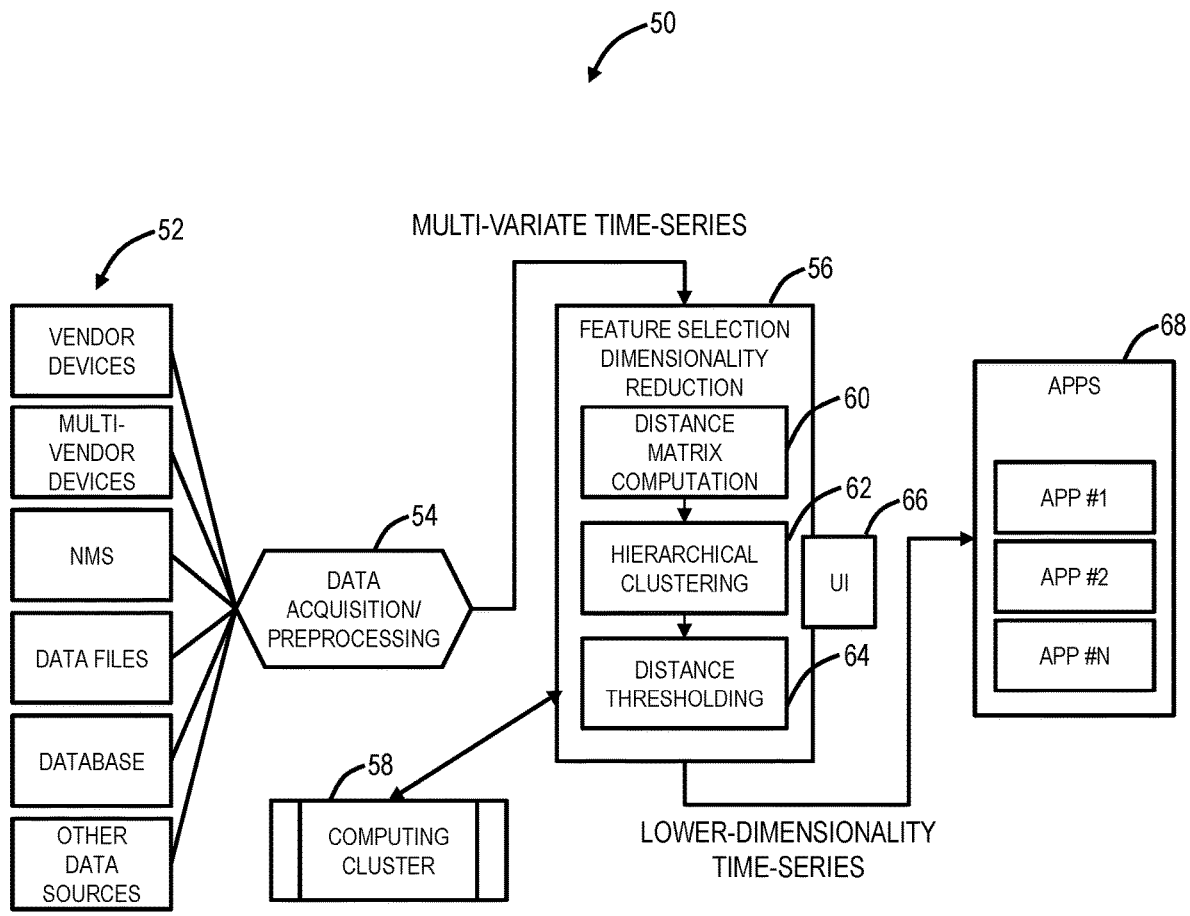
FIG. 3 is a block diagram of a feature selection and dimensionality reduction system.

Process for Automated Feature Selection and Pattern Discovery of Multi-Variate Time-Series FIG. 3 is a block diagram of a feature selection and dimensionality reduction system 50. The objective of the system 50 is to receive multi-variate time-series and output lower-dimensionality time-series. Specifically, various data 52 is acquired and preprocessed 54, and a multivariate time-series is input into a feature selection/dimensionality reduction module 56 which can be executed on a computing cluster 58 or the like. The feature selection/dimensionality reduction module 56 includes a distance matrix computation 60, hierarchical clustering 62, and distance thresholding 64. There can be a User Interface (UI) 66 for operating the feature selection/dimensionality reduction module 56. An output of the feature selection/dimensionality reduction module 56 is a lower-dimensionality time-series from the multi-variate time-series. The lower-dimensionality time-series can be used by various applications ("apps") 68. Again, as described herein, the lower-dimensionality time-series is less complex/resource-intense to process than the multi-variate time-series while preserving the same information.

Figure 4:
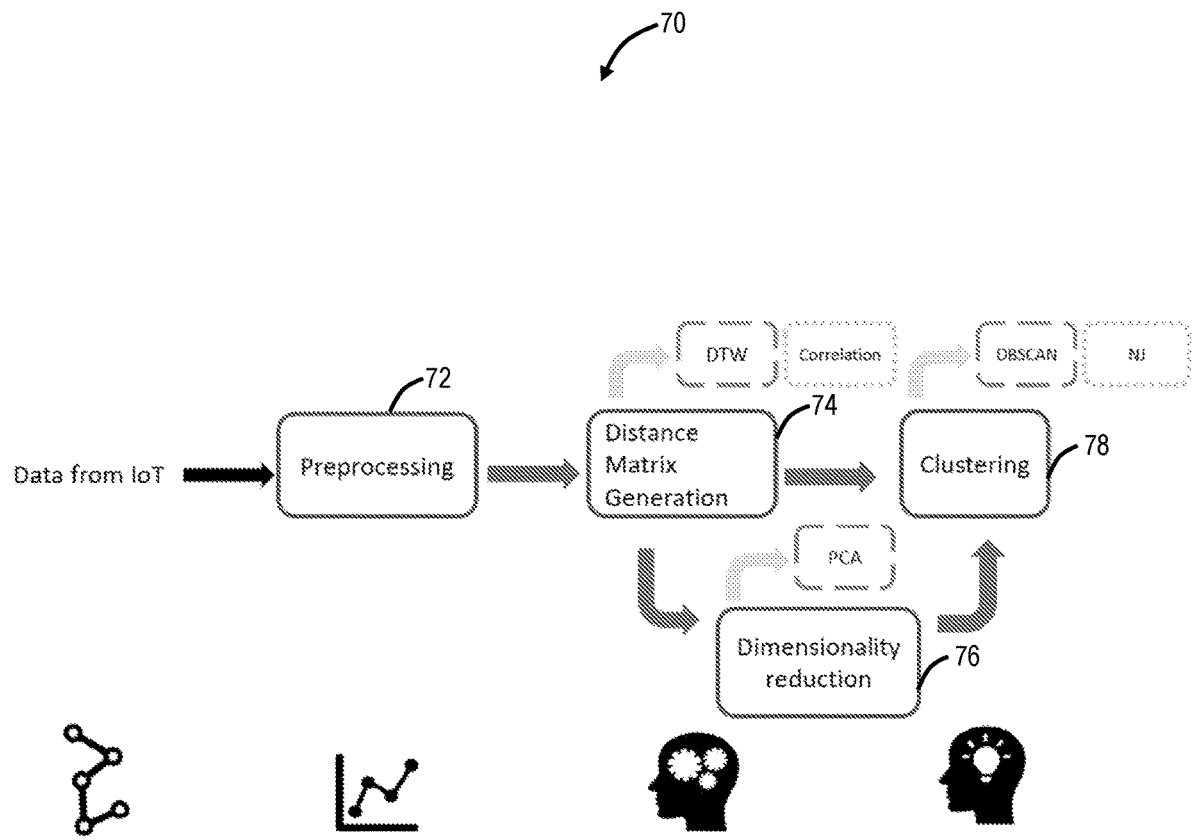
FIG. 4 is a flow diagram of a workflow associated with the feature selection and dimensionality reduction system.

FIG. 4 is a flow diagram of a workflow 70 associated with the feature selection and dimensionality reduction system 50. The workflow 70 has four stages, namely (1) preprocessing 72, (2) distance matrix generation 74, (3) dimensionality reduction 76, and (4) clustering 78. The preprocessing 72 handles issues such as devices have different sampling intervals, and the samples in time-series have missing data. The distance matrix generation 74 estimates the correlation among features. For example, two distance matrix are computed, and each is used as input for one clustering algorithm. The dimensionality reduction 76 solves the issue of the high dimensionality of features and prepares the time-series for clustering 78 analysis. Finally, the clustering 78 analysis applies two algorithms to validate the results. Since different matrix and algorithms are applied, the method is realized by two parallel workflows.

The workflow 70 includes two sequences—1) the preprocessing 72, the distance matrix generation 74 using correlation, and the clustering 78 using Neighbor-Joining (NJ), and 2) the preprocessing 72, the distance matrix generation 74 using Dynamic Time Warping (DTW), the dimensionality reduction 76 using Principal Component Analysis (PCA), and the clustering 78 using DB SCAN.

Data Preprocessing

Data preprocessing 72 helps to assess the correlation between features. The purpose is to identify out which features are redundant and should be further merged for dimensional reduction. Also, the gathered time-series can have different sampling intervals. Also, these time-series can have missing data. Therefore, the data preprocessing 72 first deals with alignments of time series. There can be two approaches to aggregating data by features.

Figure 5:
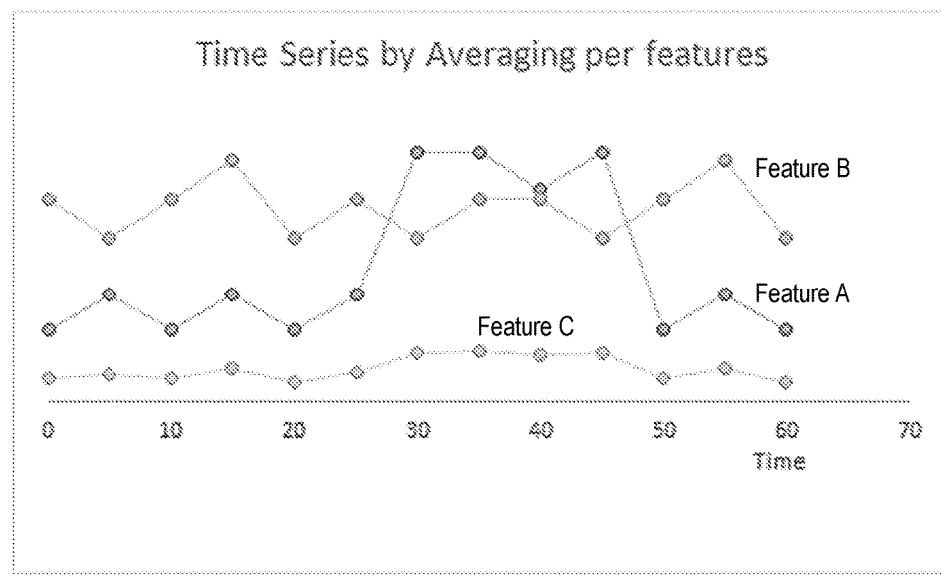
FIG. 5 is a graph of the 9 time-series of FIG. 2 aligned into 3 time-series, one for each feature that is generated by averaging the readings per timestamps from the three devices.

First, averaging the values at every time stamp. At each time stamp, there are multiple data records for each feature from different devices. This approach first performs the alignment of all time-series of the same feature by time stamps. If a timestamp has no readings from any devices, the missing value is filled as zero. Then the average value is taken for each feature at each timestamp. A sample plot of the dataset in FIG. 2 after the alignment is shown in FIG. 5.

Figure 6:
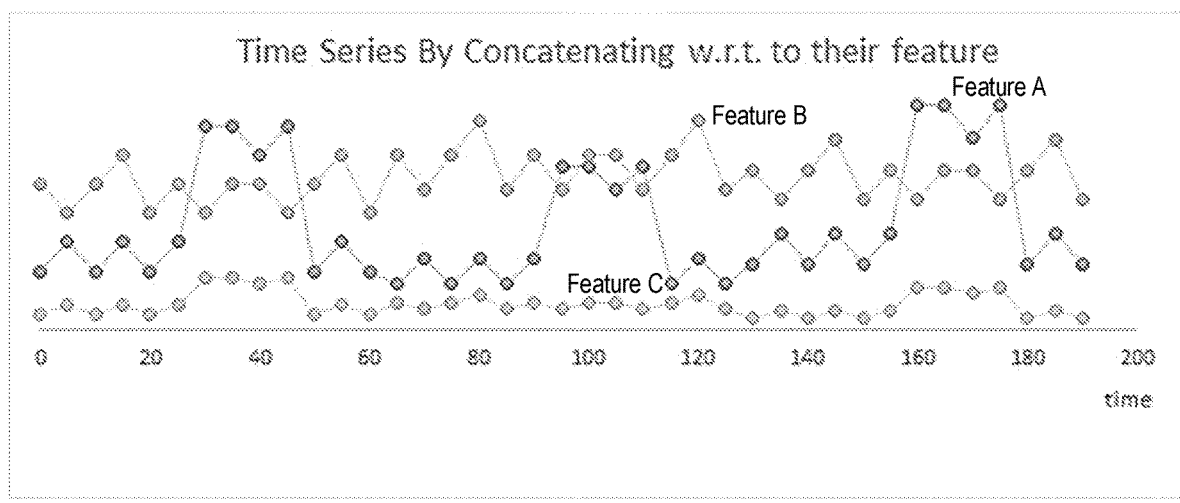
FIG. 6 is a graph of the 9 time-series of FIG. 2 aligned into 3 time-series with the three devices of the same feature appended one after the other.

Second, concatenating the time-series from different devices sequentially. This approach first creates a list of all devices. Then time-series is created for each feature by concatenating the time-series of the devices by respecting the order of that list. This is achieved by creating an artificial and longer timeline of readings. Again, empty readings are filled by zero. The order in which the time series is appended must stay consistent across different features. FIG. 6 plots the concatenated time series of FIG. 2. For example, device one has the time-series from the data points ranging between 0 to 60 seconds; device two's values range between 65 to 125 seconds; and device three's values are from 130 to 190 seconds, respectively.

The approach of averaging preserves less information in contrast to the concatenating approach. The reason behind this assumption is that the dataset is extremely sparse, hence taking the average of readings to generate a final value per timestamp does not provide an accurate value for this time-series. The approach of concatenation preserves more information because the readings at each timestamp are preserved. Consequently, much larger spans of time-series are created by appending one after the other. This leads to a subsequent quantization process.

Figure 7:
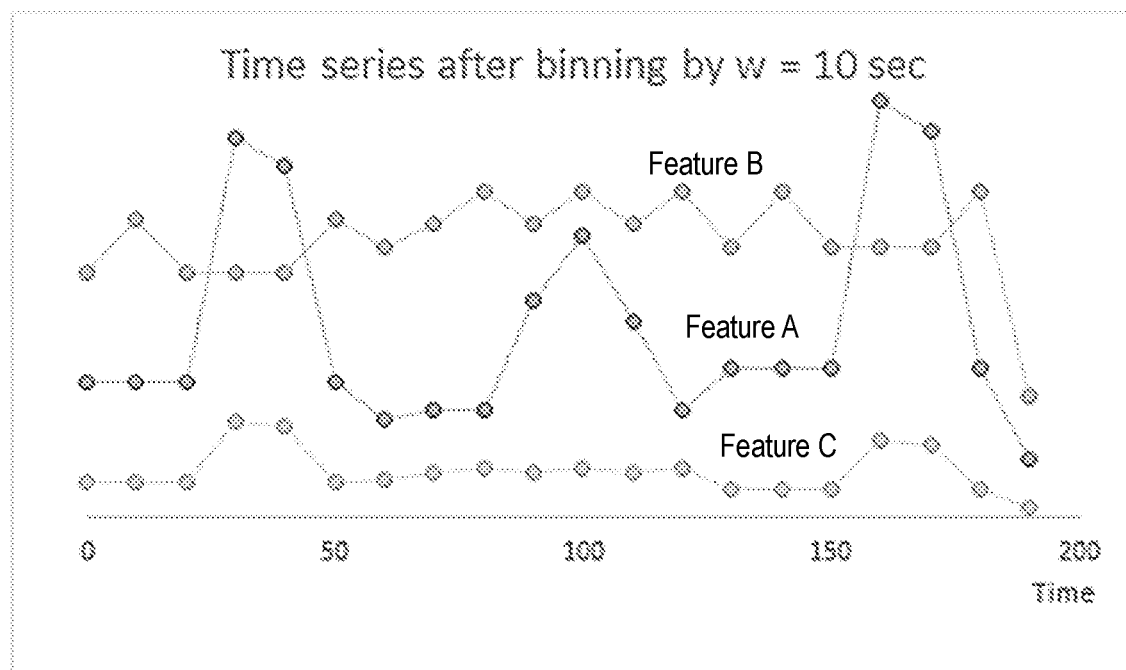
FIGS. 7 and 8 are graphs illustrating the time-series of FIG. 2 after the binning technique for a window size of 10 seconds and 20 seconds, respectively.
Figure 8:
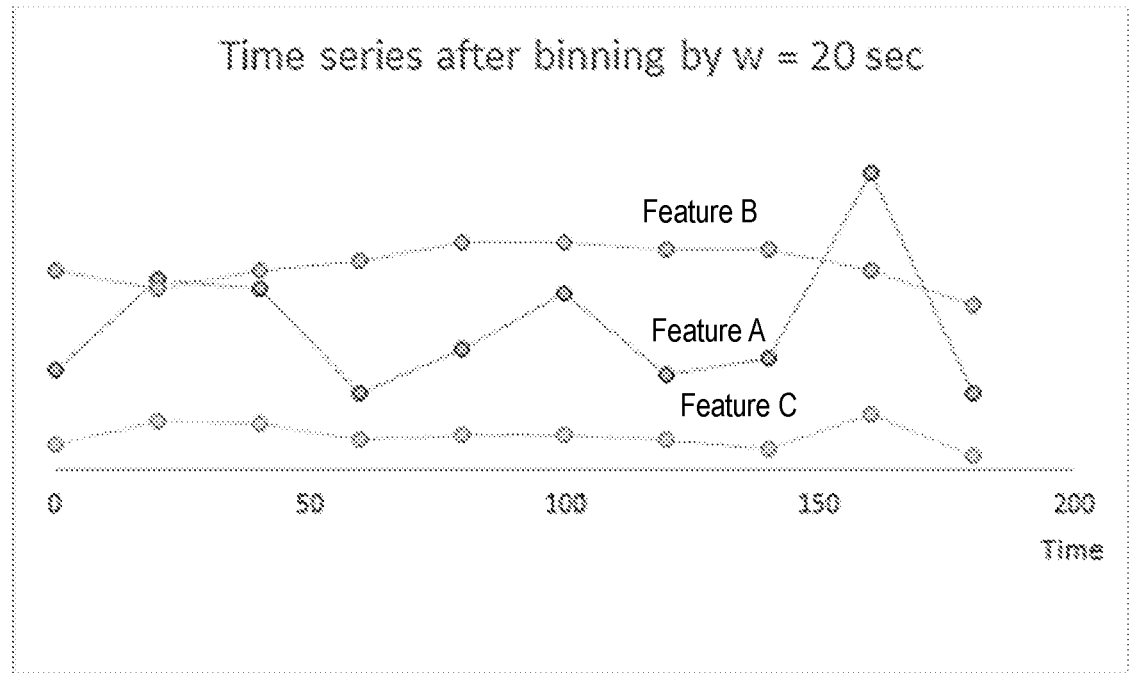
Figure 9:
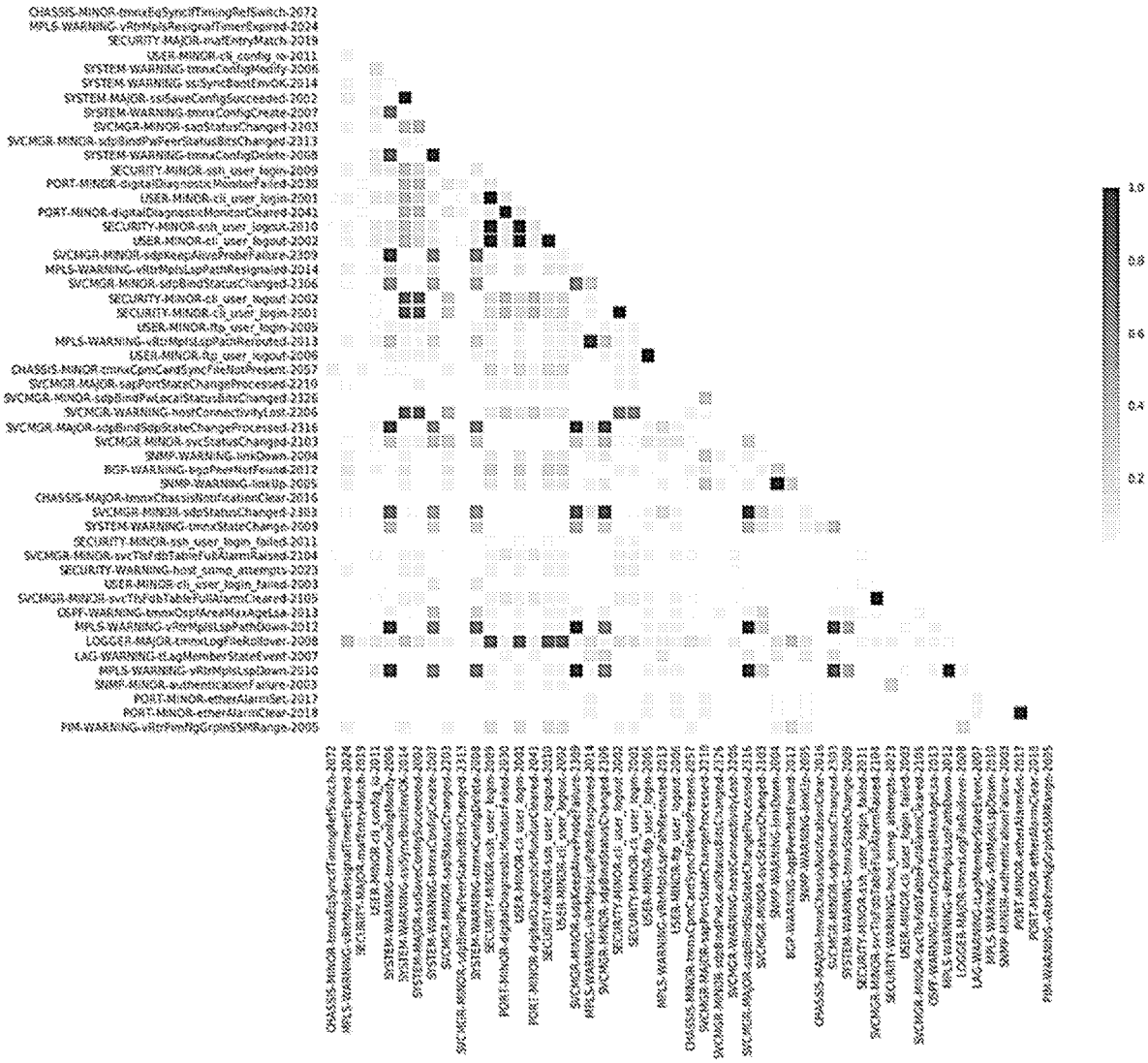
FIG. 9 is an example distance matrix between 50 binned PMs using the Needleman-Wunsch sequence alignment algorithm.

The process of quantization maps input values from a large set to the output values in a smaller set. This can include data binning or bucketing that takes a set of data points falling in a window of timestamps and reduces them into a single value. The single value is the average value of data points of multiple timestamps. This binning technique can be performed across all of the time-series, reducing the length and the dimensionality of the concatenated data. The window size is a tunable parameter as it becomes a factor for a trade-off between the processing time and the information retention. FIGS. 7 and 8 show the time-series after the binning technique for a window size of 10 seconds and 20 seconds, respectively.

Distance Matrix

The similarities between the various time-series are computed to produce a distance matrix $d_m$. Several algorithms can be used to produce this matrix, depending on the nature of the characteristics of the data and the requirements of the users in terms of accuracy and computation time. When the time-series are binned and aligned (i.e., the starting time of the bins across all dimensions is the same), a simple statistical Pearson correlation or Euclidian distance is suitable. This is the case for many of the 15-minute or 24-hour binned PMs of the network elements and that available in telecommunications networks. However, in general, when there is some latency between time-series or for unbinned raw sensor data/PMs, or when bins are not aligned, more sophisticated metrics such as advanced dynamic time warping or sequence alignment are required.

The approach herein is flexible enough to acommodate any distance function $f$ that meets the following requirements:

Given X, Y and Z, three arbitrary time-series:

$f(X,Y) \geq 0$ $f(X,Y)=0$ if and only if $X=Y$ $f(X,Y)<f(X,Z)$ if $X$ is more similar to $Y$ than $Z$ This approach also allows one to generalize the analysis of binned time-series and abstract away the temporal dimension by using sequence alignment algorithms such as Needleman-Wunsch or Smith-Waterman. For example, FIG. 8 illustrates an example distance matrix between 50 binned PMs using the Needleman-Wunsch sequence alignment algorithm.

All cells in the distance matrix are independent. This property of the matrix is critical to scale horizontally and efficiently (i.e., linearly) parallelize and distribute its computation in a cluster of machines, for instance using Hadoop or Spark. The overall complexity depends on the complexity of the distance function. One of the benefits of the approach is that it enables the user to balance accuracy versus running-time depending on their requirements and available computing resources. For example, using a fast time warping implementation, the complexity to compute the matrix is $O(nd^2)$, where d is the number of dimensions and n the length (number of bins) of each time-series.

Clustering

Next, unsupervised hierarchical clustering can be applied to the distance matrix M to select and combine the most important PMs/features. Some other clustering algorithms such as the popular k-means require the user to have some prior knowledge of the data, in particular, the number of expected clusters, which severely limits their utility for any practical application. Hierarchical clustering is completely unsupervised and does not require any human prior knowledge input.

To construct the dendrogram, a new distributed variant of the agglomerative hierarchical clustering algorithm Neighbor-Joining is presented, where PMs/features with the smallest distance are clustered first. This implementation allows the ability to scale the NJ computations horizontally and perform clustering on arbitrarily large datasets.

Neighbor-Joining is an iterative clustering algorithm that each iteration is to find the closest two nodes, join them by replacing a new node, and finally calculate the distance of this new node to all other existing nodes. The algorithm contains four stages.

The first stage of the algorithm iteration computes the sum of rows of input distance matrix, called $R_i$ computation. The variable $R_i$ holds the sum of every row of the input distance matrix, $d_m$. The cells of the distance matrix are grouped by their row index i and summed using the reduceByKey transformation (in Apache Spark), where the key is the row index i. A collectAsMap transformation (in Apache Spark) is applied to this summed variable at the beginning of the next stage in order to obtain a map variable with the row i as key and the sum of the row as values. Optimization: since $R_i$ computation is run in parallel on each partition of the datasets, this map is then broadcast to all nodes as a global variable for subsequent computations. The benefit of this approach is scalability where $R_i$ would otherwise be computed using an iterative approach.

The second stage of the algorithm is finding the minimum $Q_h$ calculation described in Al-Neama, Mohammed W., Naglaa M. Reda, and Fayed F M Ghaleb. "Accelerated guide trees construction for multiple sequence alignment." International Journal of Advanced Research 2, no. 4 (2014): 14-22, the contents of which are incorporated herein by reference. Minimum $Q_h$ is calculated by equation (1) on a vectorized version of the distance matrix. This vectorized version of the distance matric $DV_h$ formats the distance matrix into a vector to simplify the calculation without affecting the accuracy.

$$Q_h = (N-2)DV(h) - (R(i)+Rj)) \quad (1)$$

where i=1 ... N−1; j=i+1 ... N; h=((i−1)(2n−i)/(2+j−i).

Equation (1) performs the necessary transformation on the distance matrix, and minimum $Q_h$ will be the smallest value of $Q_h$ for which the two closest nodes are to be merged. Hence, equation (1) is applied to all cells of the distance matrix $d_m$ in parallel using Spark's map transformation. From there, a filter transformation is applied to obtain the $min(Q_h)$.

The third stage involves calculating the new distance values that result from merging the nodes identified by the $min(Q_h)$. It calculates the distance of a node k to the newly merged node $U_1$ as the given formula of Equation (2). The new values are then inserted at their respective distance matrix indexes for the next iteration.

$$D_{U_1 k} = \frac{D_{ik} + D_{jk}}{2} \quad (2)$$

wherein k=1 ... N; k≠i, j and $$D_{iz} = \frac{\sum_{k=1}^{N} D_{ik}}{N-2}$$

and $$D_{jz} = \frac{\sum_{k=1}^{N} D_{jk}}{N-2}$$

The formula to calculate the branch lengths $L_{iU_1}$ and $L_{jU_1}$ against this newly joint node are given by the equations:

$$L_{iU_1} = \frac{D_{ij} + D_{iz} - D_{jz}}{2} \quad (3)$$

$$L_{jU_1} = \frac{D_{ij} + D_{jz} - D_{iz}}{2}$$

Depending on the accuracy/computational requirements, several linkage functions D can be used to compute the distance of an individual PM to a cluster of PMs, including for instance the classic complete linkage, as well as single linkage, average linkage and UPGMA (Unweighted Pair Group Method with Arithmetic Mean). A new time-series, representing all PMs in the cluster is being built as part of this process. One of the benefits of the approach described herein compared to other approaches for feature selection and dimensionality reduction such as PCA, is that this approach does not behave like a black box, but instead provides a natural and intuitive representation of the similarities between the time-series, thereby enabling human experts to easily inspect, validate and/or tune the parameters of the algorithm.

The final stage updates the distance matrix for the next iteration.

Figure 10:
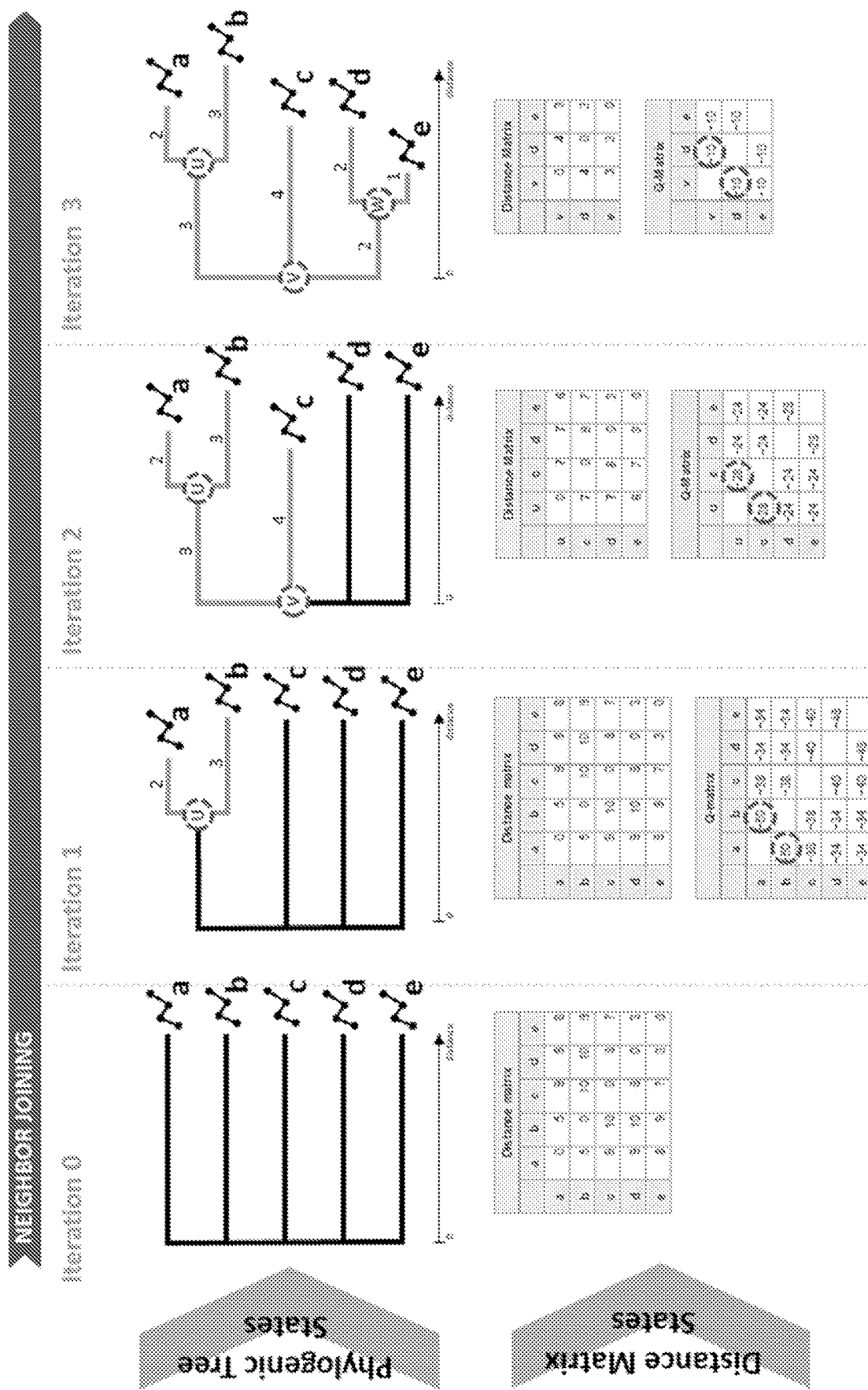
FIG. 10 is a diagram of a simple example of the neighbor-joining process.

FIG. 10 illustrates a diagram of a simple example of the neighbor-joining process. The result is a phylogenic tree that visually shows the relationship between time series. Similar to a binary tree, the leaves of this phylogenic tree represents a time series, and nodes are connected to others through branches proportional to their level of similarity measured as the distance metrics applied. FIG. 10 includes an arbitrary distance matrix. In iteration 1, the phylogenic tree initializes all the nodes with equal distances. The Q matrix is computed from the initial distance matrix, where time series a and b are identified as the closest nodes. These nodes are joined as node u. Their branch length is calculated, and the distance matrix is updated. In iteration 2, time series c and u are joined as node v. Their branch length is calculated, and the distance matrix is updated. In iteration 3, branch node v and time series d are joined as node w, and their branch length is calculated. The distance between w and e is finally calculated.

The neighbor-joining algorithm requires a distance measure for every pair-wise combination of time series. These distance measures are stored in a distance matrix that serves as a similarity measure between any two time-series.

The distance matrix can be a size N×N, where N is the number of time-series in the dataset. A correlation coefficient of a pair-wise combination of the time series can be used as the distance measure. The correlation coefficient between two random variables X and Y is defined as $$\rho(X, Y) = \frac{\text{Cov}(X, Y)}{\sqrt{\text{Var}(X)\text{Var}(Y)}}$$

A simple approach of generating a distance matrix is to iterate through each cell of the matrix and apply the above formula to the corresponding cells. The cells of a distance matrix can be represented using Resilient Distributed Datasets (RDDs) from Apache Spark. Each cell is represented by an RDD of type [(Long, Long), Double], where both Long variables correspond to indexes of row i and column j. The Double variable is a placeholder for the distance measure. Such an RDD is a distributed variable.

Figure 11:
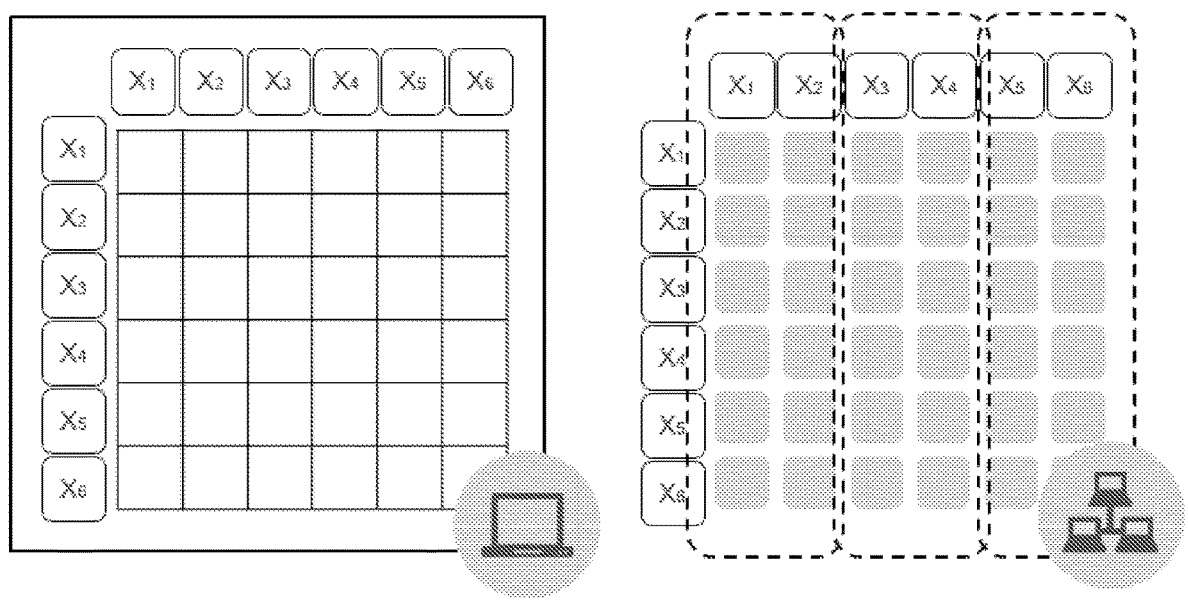
FIG. 11 is a diagram of the partition of an initial matrix into a distributed matrix.

RDDs are first created by reading the dataset from stable storage such as HDFS into a partitioned collection of records. These RDDs are further transformed by operations such as map, filter, groupBy, reduce. The parallelization breaks down a matrix into units of elements. FIG. 11 is a diagram of the partition of an initial matrix into a distributed matrix. On the left side of FIG. 11, a standard matrix data structure is on a single core. On the right side of FIG. 11, the matrix abstraction can be on a distributed environment where RDDs that represent cells of the matrix are spread out amongst three nodes.

The parallelization of neighbor-joining is limited to the level of each iteration because each iteration depends on its previous one. In every iteration of the algorithm, matrix $Q_h$ is calculated using equation (1) on the input distance matrix used to identify the identify the closest two nodes to join.

Figure 13:
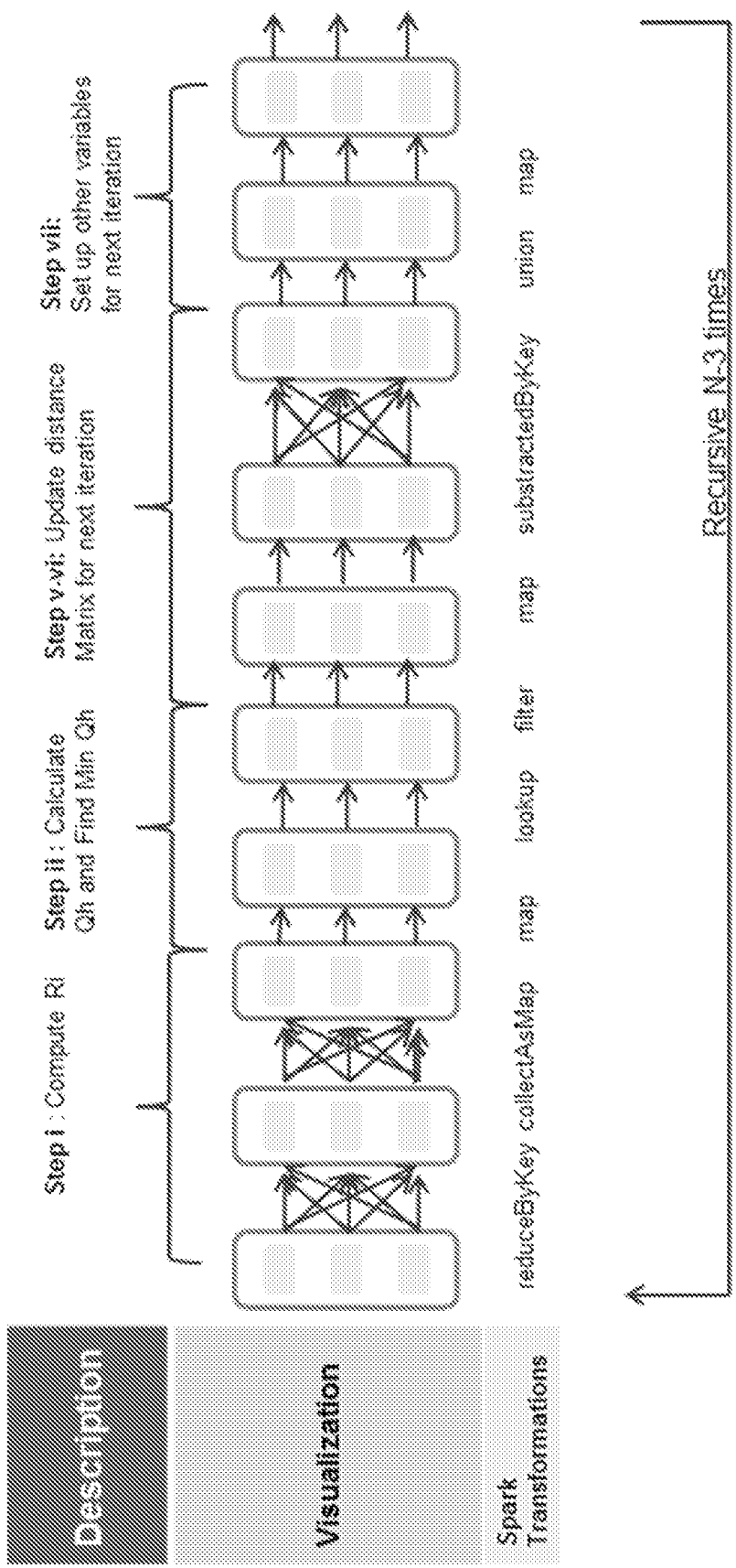
FIG. 13 is a diagram of the resulting workflow of the neighbor-joining algorithm of FIG. 12 running on Spark.

The parallelization of this algorithm comes down to parallelizing the calculation of $Q_h$. This is achieved by mapping each cell of the initial distance matrix to its new value of $Q_h$. The mapping operation is convenient in this process because the new $Q_h$ matrix is of the same size as the distance matrix at the beginning of each iteration. The parallelization version of the algorithm is presented in FIG. 12. The resulting workflow running on Spark is depicted in FIG. 13.

Figure 14:
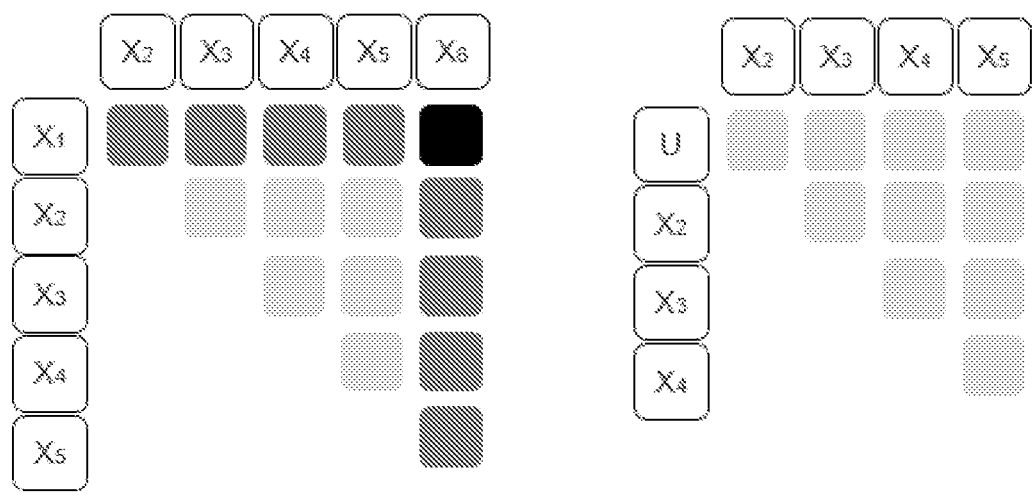
FIG. 14 is a diagram of a distance matrix update in one iteration.

Another parallelization technique applied is performing matrix operations on a distributed data structure. The neighbor-joining algorithm requires reducing by one column and one row conceptually every iteration as the result of merging two closest nodes, as shown in FIG. 14 which shows a scenario of a distance matrix update in one iteration. On the left side, the black cell in the top right corresponds to the smallest value $Q_h$ obtained. Hence, the closest nodes $X_6$ and $X_1$ need to be merged. On the right side, the corresponding row and column that contain nodes $X_6$ and $X_1$ are deleted from the distance matrix. A new cell U is placed at the smallest index position, row 1 in this case. The new distance between node U and the remaining nodes is computed.

Since the distance matrix is represented in RDDs, deleting a row and a column becomes the operation on query RDDs with keys corresponding to the row and column indexes. Adding the merged node is done by creating a new RDD with the merged value of distance. Consequently, the remaining RDDs' key is updated to reflect the changing indexes of rows and columns in adjacent sequential order with no gap.

Each stage of the workflow can be optimized through the definition of RDDs and transformations on RDDs.

Workflow Output

Figure 15:
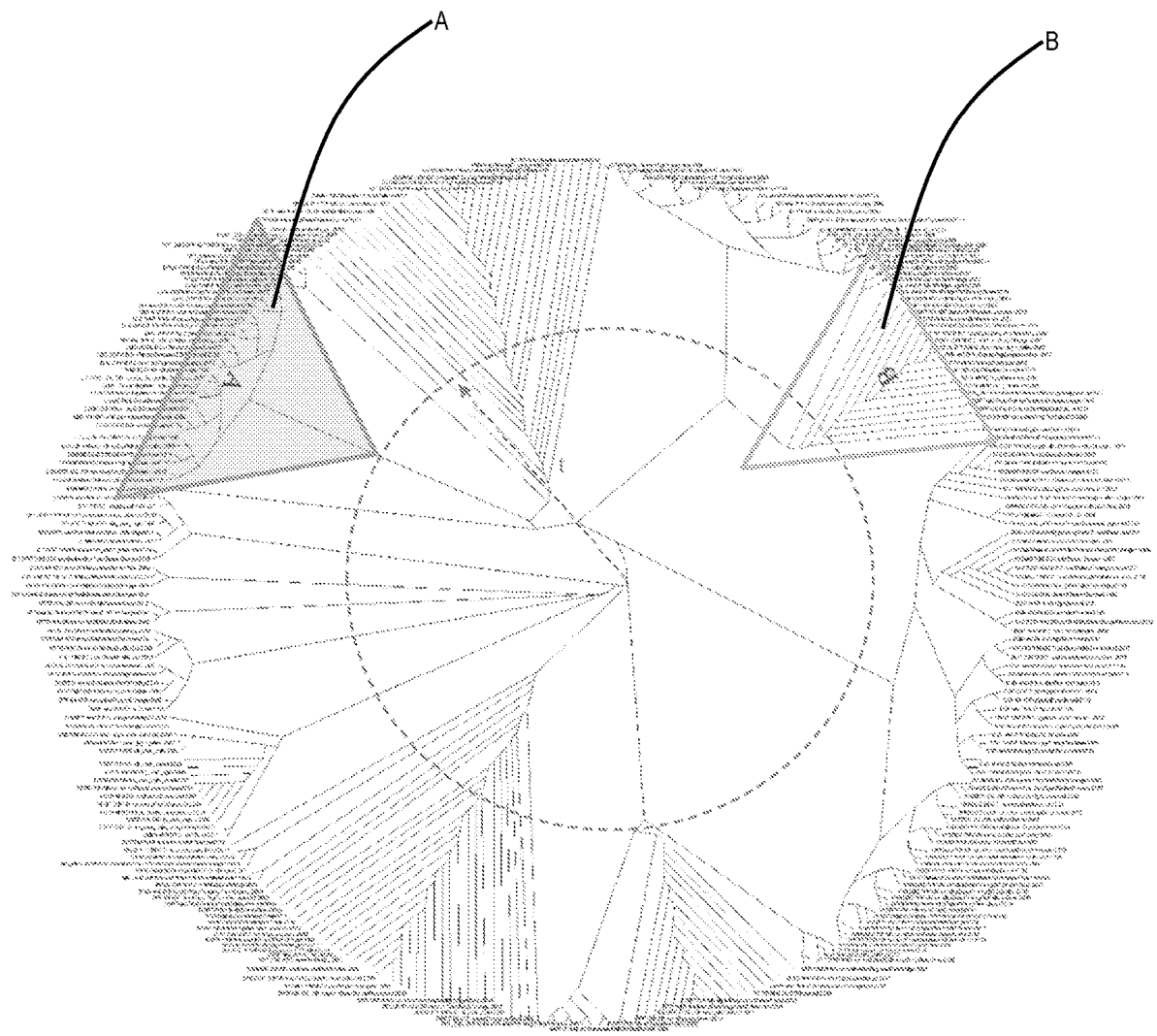
FIG. 15 is a graph of an example clustering result.

The output of the workflow follows the Newick tree format representing graph-theoretical trees with edge lengths. This output is further converted to a cladogram—a diagram that shows the relation between entities based on the branch length. The shorter the branch length, the more related the two entities are. FIG. 15 is a graph of an example clustering result. In this plot, small regions with multiple short branch lengths correspond to time-series that are closely related. Observe time-series with common labels are grouped into clusters. Further zooming in the plot, observe that neighboring features from the same cluster tend to have similar label names. The result helps to further reducing redundant data based on closely related time series.

FIG. 15 is a circular dendrogram. For example, individual PM time-series correspond to the leaves of the dendrogram, while clusters of similar PMs correspond to internal nodes. The root is located at the center of the dendrogram. The length of the branches is representative of the distance between PMs/clusters (the shorter the branch, the more similar). The dendrogram is also useful to enable users to quickly visually identify homogeneous clusters to be reduced first.

In FIG. 15, all internal nodes whose distance to the root is smaller than a given threshold t, corresponding to a new feature in the final reduced feature set. For instance in FIG. 15, the 26 time-series in cluster A will be reduced to a single new time-series without losing meaningful information. This new dimension corresponds to the representative time-series of the cluster. The 23 times-series in cluster B are more heterogeneous, than those in cluster A, and will result in 5 new features, representative of the 5 clusters at the threshold.

In this approach, it is proposed to eliminate user input and automatically compute the optimal threshold t using an unsupervised density-based clustering algorithm such as DBSCAN.

DBSCAN Clustering

Another clustering approached is explored that is time-series pairwise, in addition to the data point based correlation and clustering approach presented in the previous section. Compared to the neighbor-joining clustering algorithm, observe 1) the difference of algorithms in term of in-memory operations; and 2) the operations' effects on system level attributes including end-to-end delay, scalability, and data shuffling.

Figure 16:
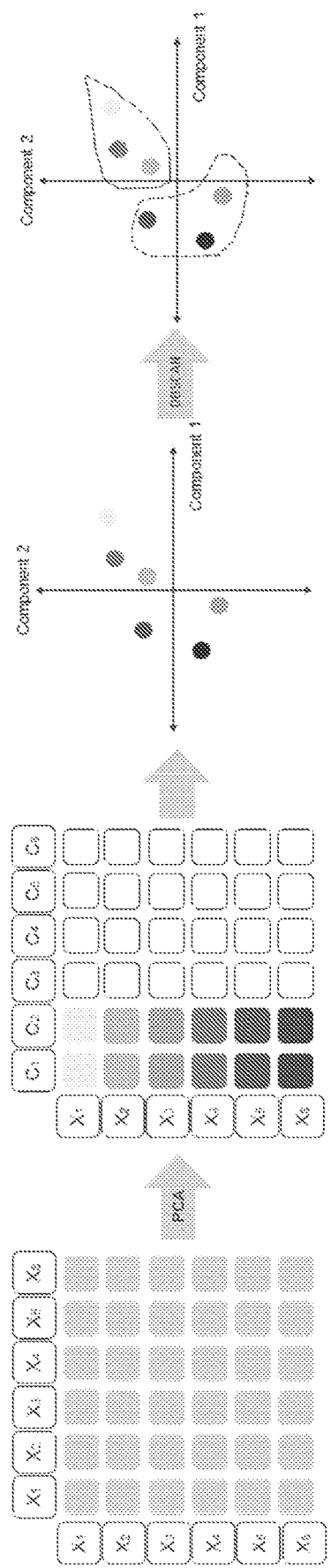
FIG. 16 is a diagram of the Density-Based Spatial Clustering of Applications with Noise (DBSCAN) clustering approach.

In this approach, the distance of any two pairs of time series is first computed. This produces a distance matrix that follows the Dynamic Time Warping (DTW) coefficients of any two time-series. This distance matrix is further transformed by the algorithm of Principle Component Analysis (PCA). The PCA transforms the distance matrix into a set of linearly uncorrelated variables, called principal components. Finally, Density-Based Spatial Clustering of Applications with Noise (DBSCAN) algorithm clusters the output from PCA. An overview of the workflow is presented in FIG. 16 which illustrates the DB SCAN clustering approach. The leftmost represents the distance matrix of the input time series measured with DTW. PCA is then applied to reduce the dimensionality. These pairs of principal components from PCA are then projected into a two-dimensional space where X-axis is component 1 and Y-axis is component 2. Finally, DBSCAN is applied to these points to find clusters.

Dynamic Time Warping (DTW)

DTW measures the similarity between sequences of any two-time series that may vary in speed referred as a lag (or delay). DTW corrects the lag by finding the minimal distance $D(i, j)$ between two-time series $X_i$ and $Y_j$. $D(i, j)$ is defined as a recursive function with the mapping starting from (1, 1) and ending at (i, j).

$$D(i,j)=|X_i+Y_j|+\min\{D(i-1,j);D(i-1,j-1);D(i,j-1)\} \quad (4)$$

A simple approach of generating a distance matrix is to iterate through each cell of the matrix and apply Equation (4). As described herein, the distance matrix abstraction can be represented by an RDD of type [(Long, Long), Double], where both Long variables correspond to indexes of row i and column j. The Double variable is a placeholder for the distance measure that is the DTW measurement in this case. Indices i and j refer to two specific time series. Hence the distance matrix RDD is generated by means of a map transformation that applies Equation (4) to all instances of an RDD.

The computing complexity of DTW is of $O(n^2)$. An approximation of a FastDTW from Salvador, S., and P. Chan. "FastDTW: Toward accurate dynamic time." Warping in Linear Time and Space (2007), the contents of which are incorporated herein by reference, with computing complexity $O(n)$ can be implemented instead. The algorithm of FastDTW is illustrated in FIG. 17.

PCA In Parallel

The high dimension distance matrix can be projected into a lower linear space to perform spatial clustering in a visualize able space. PCA performs an orthogonal projection of the distance matrix into a lower dimensional linear space with the maximized variance of the data.

By definition, PCA is obtained by 1) evaluating the covariance matrix X of the dataset and then 2) finding the eigenvectors of X through eigen decomposition.

$$C=\text{Covariance}(X)=XX^T/(n-1)$$

Since C is a symmetric matrix, it can be diagonalized such that $$C=VIV^T$$

Where V is a matrix of eigen vectors, and I is a diagonal matrix of eigen values. The principal components of X are now given by XV. The i-th principal component is given by the i-th column of XV. The only parameter specified through PCA is the number of principal components k expected. If the initial matrix X is of dimension n×m, the result of PCA on X is an n×k matrix, where each column corresponds to a principal component.

The implementation of PCA is derived from the Spark MLLibs library. Using Spark MLLibs, PCA is performed in two stages. The first stage generates the covariance matrix of X. The second stage is the eigen value decomposition achieved through Singular Value Decomposition (SVD). This approach accepts a single parameter k that specify how many principal components the user seeks.

The input is the distance matrix formatted in RDD[vector], whereby each vector contains the data points of one time-series.

Internally, the approach converts the input RDD [Vector] into Spark RowMatrix, an abstraction of a row-oriented distributed matrix with properties defining the number of rows and columns. RowMatrix consists of a set of numerical algorithms on matrixes that applies breeze, a generic, and powerful numerical processing library.

Finally, the principal components are stored as a local matrix of size n×k where each column corresponds for one principal component. The columns are in descending order of component variance. The matrix is used as input to the DBSCAN algorithm.

Parallel DBSCAN

DBSCAN clusters a set of spatial data points based on their proximity. This non-supervised machine learning method does not require prior knowledge of the count of clusters in the dataset and can find clusters of arbitrary shape (see Ester, Martin, Hans-Peter Kriegel, Jörg Sander, and Xiaowei Xu. "A density-based algorithm for discovering clusters in large spatial databases with noise." In Kdd, vol. 96, no. 34, pp. 226-231. 1996, the contents of which are incorporated herein by reference). Two parameters are expected for the DBSCAN algorithm, namely $\text{minP}_{ts}$ and eps. $\text{minP}_{ts}$ is the minimum number of objects required to form a dense region. eps is a measure of proximity that defines if a spatial point should be considered into a cluster.

Figure 18:
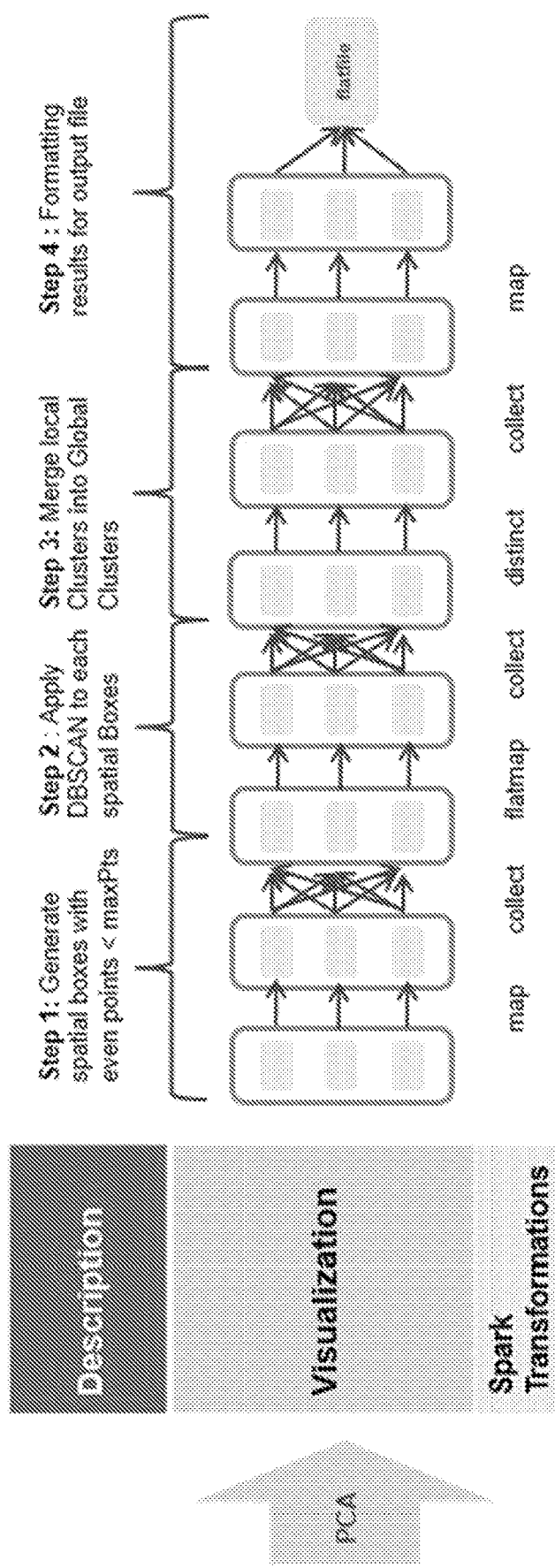
FIG. 18 is a diagram of DBSCAN workflow adapted for Spark.

In an embodiment, an open source implementation of DBSCAN on Spark is used for the two-dimensional space clustering (see Cordova, Irving, and Teng-Sheng Moh. "Dbscan on resilient distributed datasets." In High-Performance Computing & Simulation (HPCS), 2015 International Conference on, pp. 531-540. IEEE, 2015, the contents of which are incorporated herein by reference). This implies that spatial input points need to be in two dimensions. This is achieved by using PCA with a number of principal components k=2 on the distance matrix. In contrast to the traditional DBSCAN algorithm, this parallel version introduces a third parameter $\text{maxP}_{ts}$ that limit the maximum number of points. The implementation of the entire workflow using Spark is depicted in FIG. 18. The distance matrix is the starting point of the workflow where each cell is the coefficient obtained from the distance function applied to $X_i$ and $X_j$. Then the distance matrix is transformed by PCA. In this case, the first two components are kept. These two components are used as spatial coordinates. Each pair of cells is represented as a point in the spatial plot. Eventually, DB SCAN is applied to identify clusters.

The parallel implementation of DBSCAN follows the Map-Reduce principles by mapping (or breaking down) the global spatial area that englobes all input data spatial points into smaller areas with an even number of spatial points that can be processed in parallel. The results of each smaller areas are then reduced (or aggregated) to obtain the final DBSCAN result for the entire spatial area. The parallel DBSCAN algorithm is broken down into three main stages:

Data partitioning includes spatial points divided evenly into partitions based on their proximity;

Local clustering for the application of a traditional naive DBSCAN to each partition containing the spatial points;

Global merging local clusters of each partition to generate global clusters.

Figure 19:
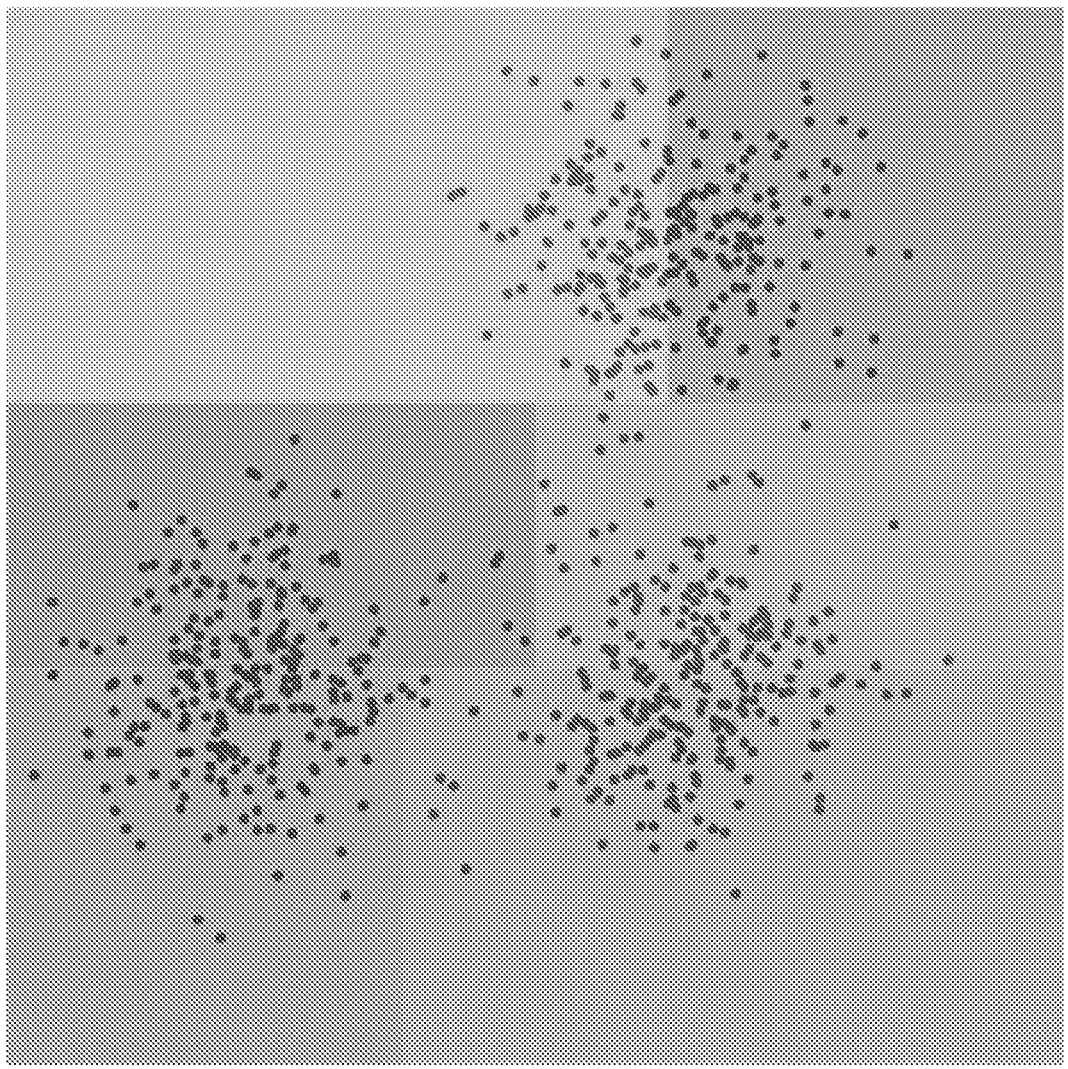
FIG. 19 is a representation of spatial partitioning in smaller rectangles of the global rectangle area.

Step 1 Data Partitioning distributes the spatial input points evenly into smaller rectangular spaces based on spatial proximity. The input is an RDD[Vector], where each vector is of size two containing a horizontal x and vertical y coordinates of a spatial point. This RDD[Vector] goes through transformations based on spatial density in order to identify their initial partition that is associated with a rectangle subspace space in the global search area. As depicted in FIG. 19, a rectangle is an object defined by dialog coordinates. These rectangles are partitioned input to local clustering where DB SCAN is applied to each partition in parallel.

The rectangle object is generated by mapping each spatial point in the RDD[Vector] to a rectangle space of size eps * eps, where eps is a measure of proximity. AggregateByKey is then used to group and count all the points that fit within the same rectangular space of the eps * eps. The resulting variable minimumRectangleWithCounts is a list of the spatial rectangle and the spatial count points it contains and serves as the initial step to data partitioning.

The variable minimumRectangleWithCounts is then partitioned using the custom partition method of EvenSplitPartitioner. This recursive method iterates through each rectangle to ensure a rectangle should contain spatial points less than the maxPointsPerPartition. Otherwise, the partition method recursively splits the rectangle and resizes it until the rectangle meets that criterion.

The partitions are finally merged to common clusters. These spatial points are formatted with a label of their respective partition. This variable is an RDD[id, point], where id is an integer referring to a partition; and the point is a tuple of values identifying the spatial coordinates of a data point.

Step 2 Local DBSCAN applies Local DBSCAN to each partition of the data. Spatial points are first grouped into their partition using the Spark groupByKey transformation. Then, a traditional local DBSCAN is applied to each partition using the Spark flatMapValues transformation on an array of spatial points in this case.

Step 3 Global Clustering merges above local clusters into global clusters. The RDDs in step 2 are labeled by a local cluster id from the local DBSCAN transformations. The map transformation is applied to the local cluster id by assigning a distinct id to unique clusters and a common cluster id to connected clusters.

Figure 20:
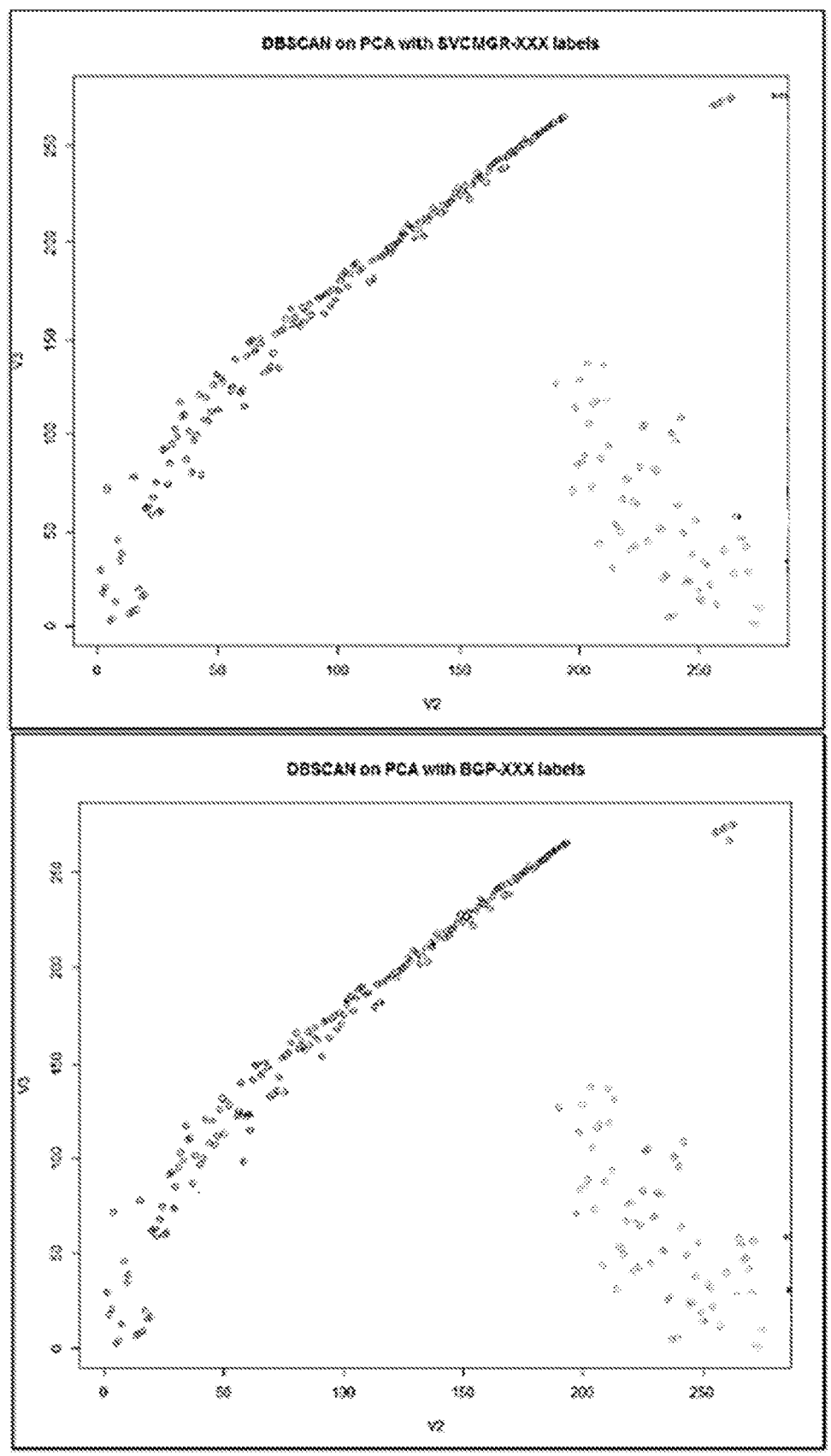
FIG. 20 is graphs of visualization of DB SCAN clustering of devices.

The output of DB SCAN contains the time series labeled with their associated cluster. The cluster is plotted in FIG. 20. The points represent the spatial projection generated by PCA on the distance matrix. Both of the plots are from the same clustering results. To compare with the neighbor-joining clustering method, the data points with labels are plotted starting. In both cases, the data points of each label further spread into five clusters of different color schemes. The findings are complementary to the neighbor-joining clustering, as DBSCAN provides a finer-grained clustering of the data points of the same label prefix.

Scalability

Scalability is the ability of a system to sustain increasing workloads by making use of additional resources. In the context of clustering workflows, the workload is produced by data processing tasks that load the data into RDDs and perform transformations on RDDs. A data processing task is broken up across stages, therefore generates new RDDs and thus new partitions as the result of each stage. Each task is assigned to a single or multiple cores. The number of cores affects the level of parallelism by driving the number of Spark executors required for a task.

Each Spark executor hosts a single or multiple data partitions that the tasks are executed. Thus the number of executors for a stage is driven by the factors of (1) the number of tasks of a stage, which is driven by the transformations within a workflow; (2) spark.task.CPUs, the number of cores allocated for each task, which is one by default; and (3) spark.executor.cores, the number of cores to use on each executor, which is one by default.

In evaluation experiments, the same dataset is used, and the total number of cores is varied to observe the processing time of the same workload. FIG. 21 plots the processing time of the neighbor-joining workflow as the number of cores scales from 1 to 55. Beyond 55 cores, it has not been observed any improvement. The processing time is more than 8 minutes when only a single core is set. The optimal processing time is reduced to approximately 3 minutes at 12 cores allocated. Over 12 cores, the overhead of data partition on distributed cores surpasses the performance gain of parallelism.

To further identify the tasks that contribute most to the processing time, we decompose the processing time as plotted in FIG. 22 when the number of cores changes from 10 to 20. The plot shows the most significant change is the percentage of Shuffle Read/Write Time that increases from 7.6% to 17.18%, more than twice. This confirms that increasing the number of cores incurs the higher level of parallelism but more overhead of data shuffling.

Figure 23:
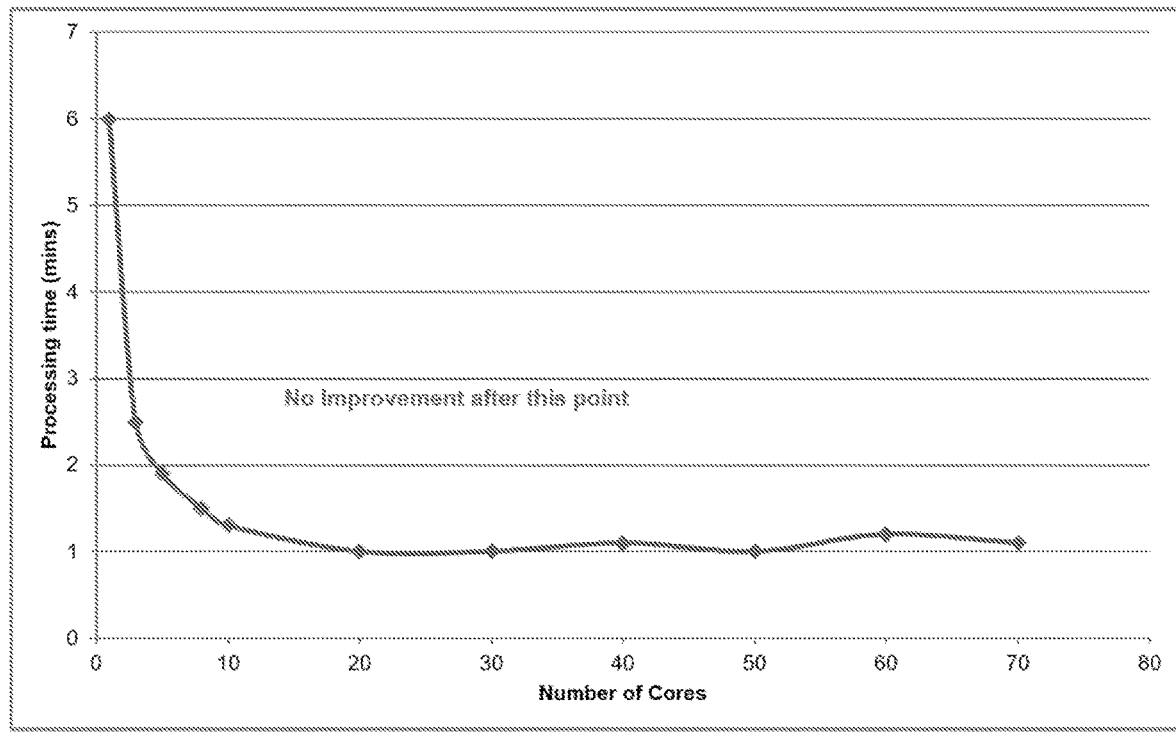
FIG. 23 is a graph of the scalability of the DBSCAN workflow.

The DBSCAN workflow is evaluated in the same experimental setup. The processing time of the workflow is measured by varying the number of cores. The measured processing time includes including the stages of DTW and PCA. The plot in FIG. 23 shows the processing time of the workflow is approximate 6 minutes. After the system reaches 20 cores, the processing time remains a plateau value around 1 minute even when the number of cores increases from 20 to 60 cores. The observation is different from the scalability plot of the neighbor-joining workflow. The plot shows changing the number of cores that increases the level of parallelism has no significant effect on the processing time. To identify the intrinsic factors leading to this scalability behavior, we decompose the processing time to tasks as shown in the top chart of FIG. 24. It shows the majority of the processing time is spent on data preprocessing and generation of distance metrics as inputs to PCA and DBSCAN.

Figure 24:
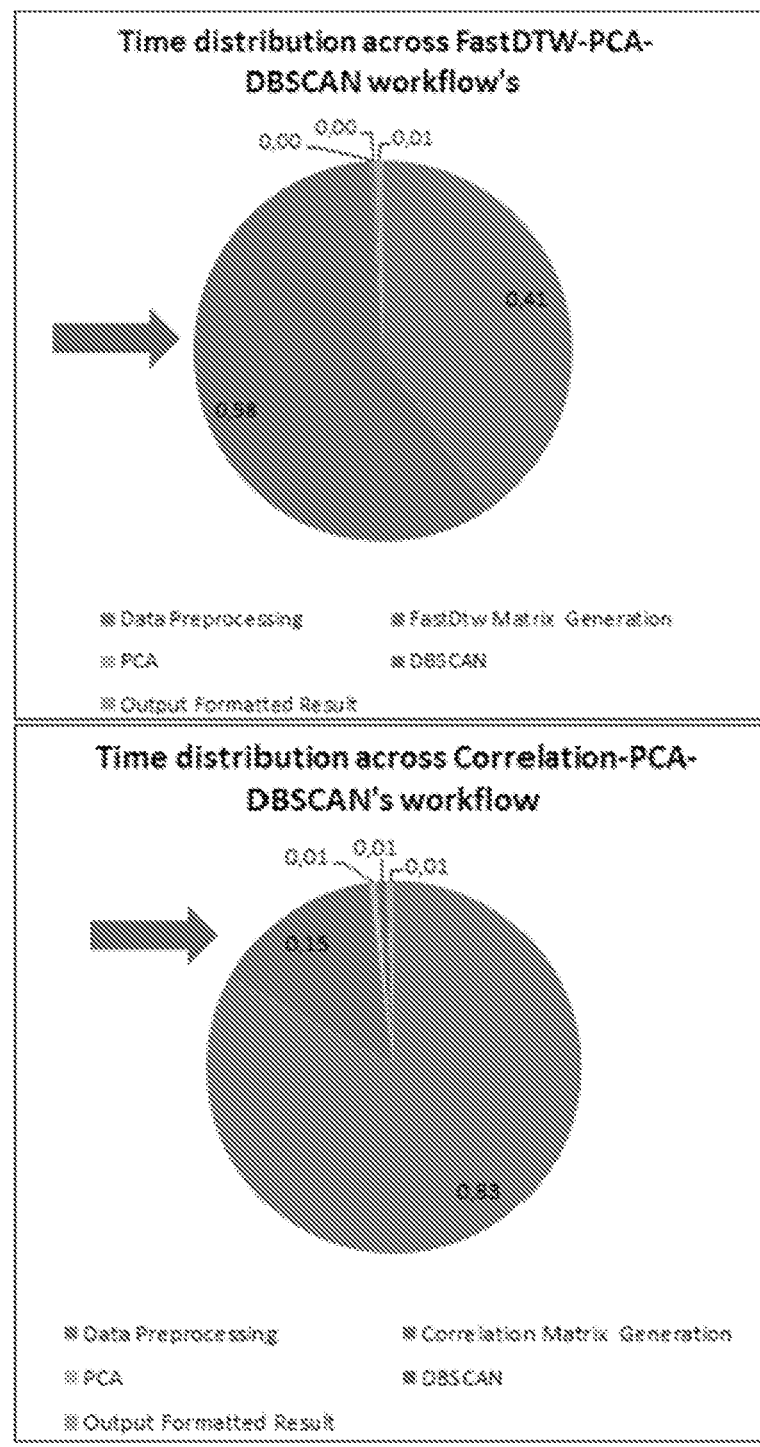
FIG. 24 is a graph of processing time decomposition of DBSCAN tasks with different distance metrics.

The distribution of the processing time is further compared given different distance metrics. The distance metrics generated by fast DTW and by correlation as used in the neighbor-joining workflow are compared. FIG. 24 shows the fast DTW occupies approximately 58% of the total process time, while the correlation method only incurs 15% of the total processing time. Above results indicate the operations in the DTW-PCA-DB SCAN workflow reach to the optimal level of parallelism running on 20 cores given the dataset. The data shuffling load in this workflow is not a dominating factor and thus increasing the number of cores does not cause overhead on the processing time.

Process

Figure 25:
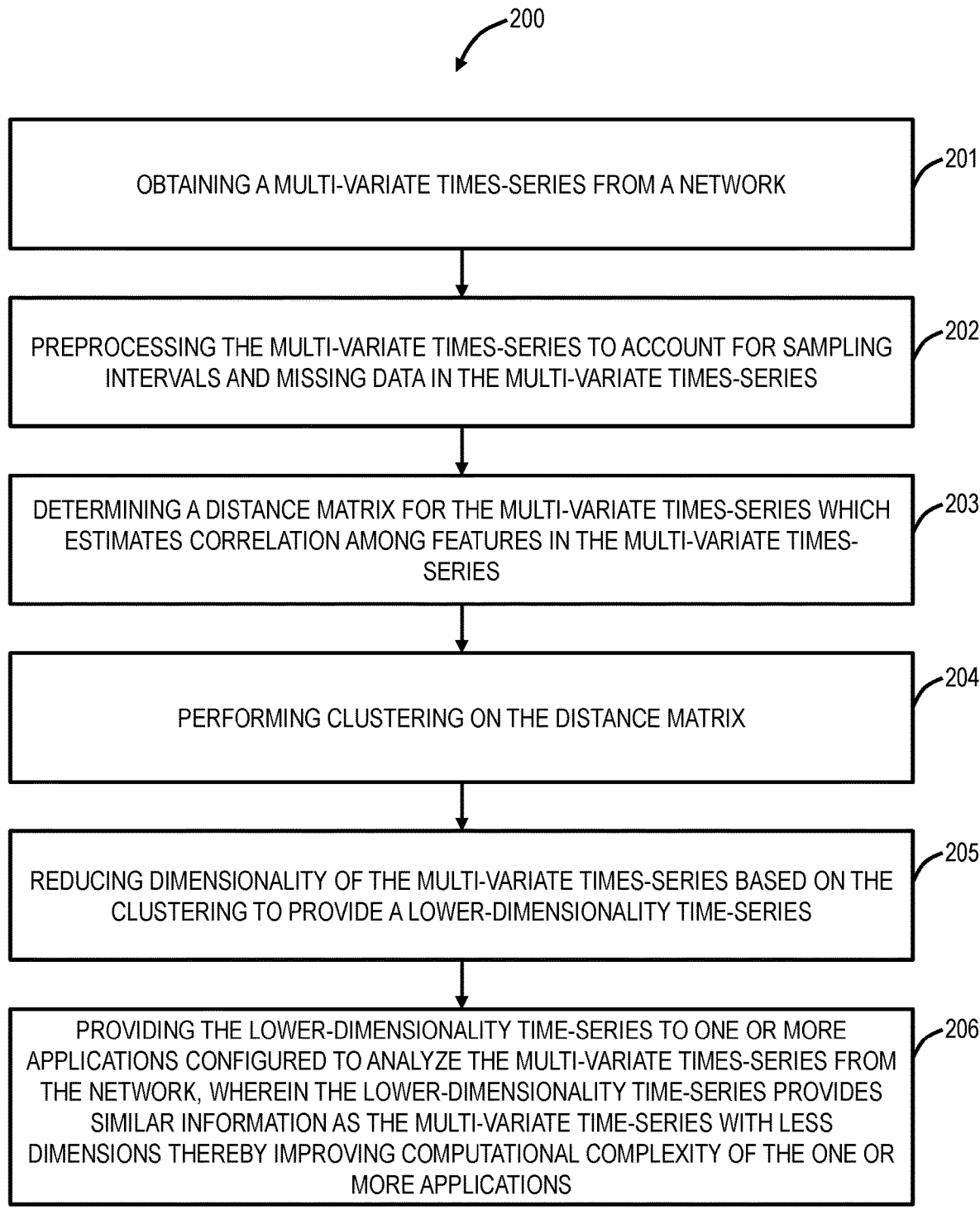
FIG. 25 is a flowchart of a process of automated feature selection and pattern discovery of multi-variate time-series.

FIG. 25 is a flowchart of a process 200 of automated feature selection and pattern discovery of multi-variate time-series. The process 200 includes obtaining a multi-variate times-series from a network (step 201); preprocessing the multi-variate times-series to account for sampling intervals and missing data in the multi-variate times-series (step 202); determining a distance matrix for the multi-variate times-series which estimates correlation among features in the multi-variate times-series (step 203); performing clustering on the distance matrix (step 204); reducing dimensionality of the multi-variate times-series based on the clustering to provide a lower-dimensionality time-series (step 205); and providing the lower-dimensionality time-series to one or more applications configured to analyze the multi-variate times-series from the network, wherein the lower-dimensionality time-series provides similar information as the multi-variate time-series with fewer dimensions thereby improving computational complexity of the one or more applications (step 206).

The distance matrix can be a first distance matrix, and the process 200 can further include determining a second distance matrix for the multi-variate times-series with a different technique than the first distance matrix; performing clustering on the second distance matrix; and utilizing the clustered second distance matrix to validate results for the lower-dimensionality time-series from the first distance matrix. The second distance matrix can be generated using correlation and the clustering on the second distance matrix is performed utilizing neighbor-joining, and the first distance matrix is generated using Dynamic Time Warping, the dimensionality is reduced utilizing Principal Component Analysis, and the clustering on the first distance matrix is performed using DB SCAN.

The preprocessing can include concatenating the multi-variate times-series from different devices sequentially with empty readings filled by zero. The distance matrix can be determined through a sequence alignment algorithm. The clustering can utilize neighbor-joining where features with the smallest distance are cluster first. The multi-variate times-series can include Performance Monitoring (PM) data from a telecommunications network or data from Internet of Things (IoT) devices.

The clustering processes described above are novel in the way their computation can be parallelized and executed on a distributed cluster of computers (e.g., in the cloud), which is mandatory for being used to analyze large telecommunication networks. These processes are expected to be leveraged for at least two use-cases in network analytic products, namely: a feature-selection engine and/or semi-supervised machine learning in applications.

Server

Figure 26:
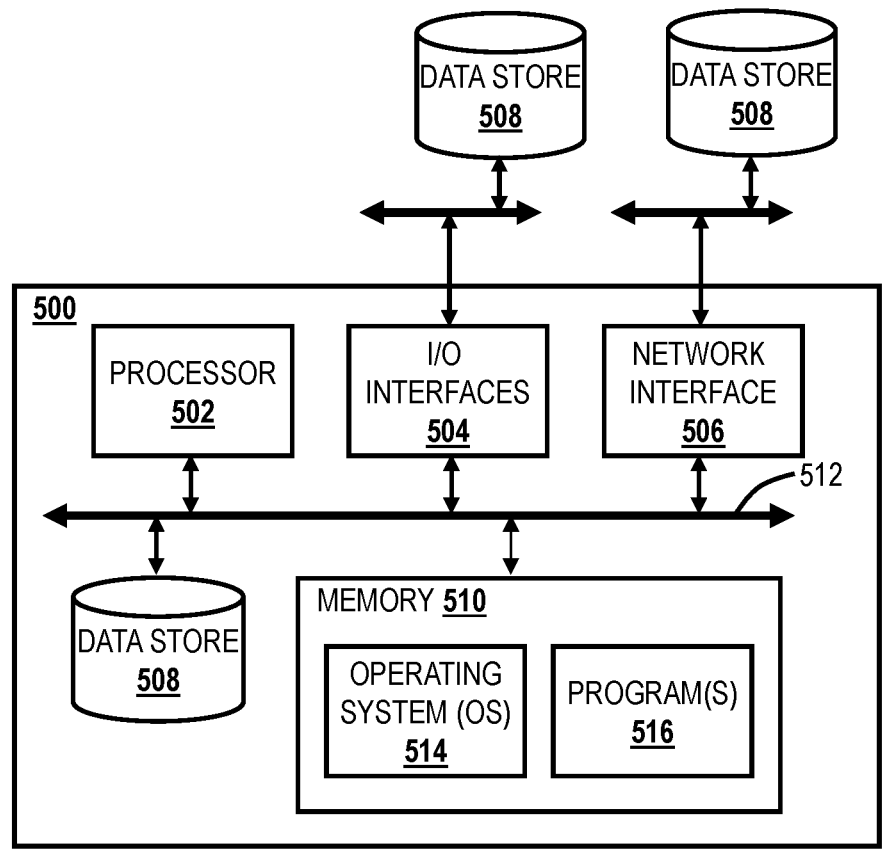
FIG. 26 is a block diagram of a server which may be used to implement the systems and methods described herein.

FIG. 26 is a block diagram of a server 500 which may be used to implement the systems and methods described herein. The server 500 can implement the various processes associated with the systems and methods described herein. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 26 depicts the server 500 in an oversimplified manner, and practical embodiments may include additional components and suitably configured processing logic to support known or conventional operating features that are not described in detail herein. The components (502, 504, 506, 508, and 510) are communicatively coupled via a local interface 512. The local interface 512 may be, for example, but not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate over a network, such as the Internet, a wide area network (WAN), a local area network (LAN), and the like, etc. The network interface 506 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500 such as, for example, an internal hard drive connected to the local interface 512 in the server 500. Additionally, in another embodiment, the data store 508 may be located external to the server 500 such as, for example, an external hard drive connected to the I/O interfaces 504 (e.g., SCSI or USB connection). In a further embodiment, the data store 508 may be connected to the server 500 through a network, such as, for example, a network attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of automated feature selection and pattern discovery of multi-variate time-series, comprising:
    obtaining a multi-variate times-series from a network, wherein the multi-variate times-series includes variables representing operational status of the network;
    preprocessing the multi-variate times-series to account for sampling intervals to align the variables in the multi-variate times-series and to account for missing data in the multi-variate times-series;
    determining a distance matrix for the multi-variate times-series which estimates correlation among features in the multi-variate times-series;
    performing clustering on the distance matrix;
    reducing dimensionality of the multi-variate times-series based on the clustering to provide a lower-dimensionality times-series; and
    providing the lower-dimensionality times-series to one or more applications configured to analyze the multi-variate times-series from the network, wherein the lower-dimensionality times-series provides similar information as the multi-variate time series with fewer dimensions thereby improving computational complexity of the one or more applications.

2. The method of claim 1, wherein the distance matrix is a first distance matrix, and further comprising:
    determining a second distance matrix for the multi-variate times-series with a different technique than the first distance matrix;
    performing clustering on the second distance matrix; and
    utilizing the clustered second distance matrix to validate results for the lower-dimensionality times-series from the first distance matrix.

3. The method of claim 2, wherein the second distance matrix is generated using correlation and the clustering on the second distance matrix is performed utilizing neighbor-joining,
    wherein the first distance matrix is generated using Dynamic Time Warping, the dimensionality is reduced utilizing Principal Component Analysis, and the clustering on the first distance matrix is performed using DBSCAN.

4. The method of claim 1, wherein the distance matrix is determined through a sequence alignment algorithm.

5. The method of claim 1, wherein the clustering utilizes neighbor-joining where features with a smallest distance are cluster first.

6. The method of claim 1, wherein the multi-variate times-series include Performance Monitoring (PM) data from a telecommunications network.

7. The method of claim 1, wherein the multi-variate times-series include data from Internet of Things (IoT) devices.

8. A computing system comprising:
    one or more processors; and
    memory storing instructions that, when executed, cause the one or more processors to
        obtain a multi-variate times-series from a network, wherein the multi-variate times-series includes variables representing operational status of the network,
        preprocess the multi-variate times-series to account for sampling intervals to align the variables in the multi-variate times-series and to account for missing data in the multi-variate times-series,
        determine a distance matrix for the multi-variate times-series which estimates correlation among features in the multi-variate times-series, perform clustering on the distance matrix,
reduce dimensionality of the multi-variate times-series based on the clustering to provide a lower-dimensionality times-series, and
provide the lower-dimensionality times-series to one or more applications configured to analyze the multi-variate times-series from the network, wherein the lower-dimensionality times-series provides similar information as the multi-variate times-series with fewer dimensions thereby improving computational complexity of the one or more applications.

9. The computing system of claim 8, wherein the distance matrix is a first distance matrix, and the memory storing instructions that, when executed, further cause the one or more processors to
determine a second distance matrix for the multi-variate times-series with a different technique than the first distance matrix,
perform clustering on the second distance matrix, and
utilize the clustered second distance matrix to validate results for the lower-dimensionality times-series from the first distance matrix.

10. The computing system of claim 9, wherein the second distance matrix is generated using correlation and the clustering on the second distance matrix is performed utilizing neighbor-joining,
wherein the first distance matrix is generated using Dynamic Time Warping, the dimensionality is reduced utilizing Principal Component Analysis, and the clustering on the first distance matrix is performed using DBSCAN.

11. The computing system of claim 8, wherein the distance matrix is determined through a sequence alignment algorithm.

12. The computing system of claim 8, wherein the cluster utilizes neighbor-joining where features with a smallest distance are cluster first.

13. The computing system of claim 8, wherein the multi-variate times-series include Performance Monitoring (PM) data from a telecommunications network.

14. The computing system of claim 8, wherein the multi-variate times-series include data from Internet of Things (IoT) devices.

15. A non-transitory computer-readable medium comprising instructions that, when executed, cause one or more processors to perform the steps of:
obtaining a multi-variate times-series from a network, wherein the multi-variate times-series includes variables representing operational status of the network;
preprocessing the multi-variate times-series to account for sampling intervals to align the variables in the multi-variate times-series and to account for missing data in the multi-variate times-series;
determining a distance matrix for the multi-variate times-series which estimates correlation among features in the multi-variate times-series;
performing clustering on the distance matrix;
reducing dimensionality of the multi-variate times-series based on the clustering to provide a lower-dimensionality times-series; and
providing the lower-dimensionality times-series to one or more applications configured to analyze the multi-variate times-series from the network, wherein the lower-dimensionality time-series provides similar information as the multi-variate time series with fewer dimensions thereby improving computational complexity of the one or more applications.

16. The non-transitory computer-readable medium of claim 15, wherein the distance matrix is a first distance matrix, and wherein the instructions that, when executed, further cause one or more processors to perform the steps of
determining a second distance matrix for the multi-variate times-series with a different technique than the first distance matrix;
performing clustering on the second distance matrix; and
utilizing the clustered second distance matrix to validate results for the lower-dimensionality times-series from the first distance matrix.

17. The non-transitory computer-readable medium of claim 16, wherein the second distance matrix is generated using correlation and the clustering on the second distance matrix is performed utilizing neighbor-joining,
wherein the first distance matrix is generated using Dynamic Time Warping, the dimensionality is reduced utilizing Principal Component Analysis, and the clustering on the first distance matrix is performed using DBSCAN.

18. The non-transitory computer-readable medium of claim 15, wherein the multi-variate times-series include one of Performance Monitoring (PM) data from a telecommunications network and data from Internet of Things (IoT) devices.

19. The non-transitory computer-readable medium of claim 15, wherein the distance matrix is determined through a sequence alignment algorithm.

20. The non-transitory computer-readable medium of claim 15, wherein the cluster utilizes neighbor-joining where features with a smallest distance are cluster first.

* * * * *